US008244619B2

(12) United States Patent
Kagarlis et al.

(10) Patent No.: US 8,244,619 B2
(45) Date of Patent: Aug. 14, 2012

(54) PRICE INDEXING

(75) Inventors: Marios A. Kagarlis, Wellesley, MA (US); David W. Peterson, Harvard, MA (US)

(73) Assignee: Radar Logic Inc., New York, NY (US)

( * ) Notice: Subject to any disclaimer, the term of this patent is extended or adjusted under 35 U.S.C. 154(b) by 0 days.

(21) Appl. No.: 12/806,393

(22) Filed: Aug. 11, 2010

(65) Prior Publication Data
US 2011/0178905 A1    Jul. 21, 2011

Related U.S. Application Data

(63) Continuation of application No. 11/674,467, filed on Feb. 13, 2007, now abandoned, which is a continuation-in-part of application No. 11/620,417, filed on Jan. 5, 2007, now abandoned.

(51) Int. Cl.
*G06Q 40/00* (2012.01)
(52) U.S. Cl. .......... 705/36 R; 705/35; 705/36 T; 705/37
(58) Field of Classification Search .............. 705/35–37
See application file for complete search history.

(56) References Cited

U.S. PATENT DOCUMENTS

| 6,064,958 | A * | 5/2000 | Takahashi et al. .......... 704/243 |
| 6,317,640 | B1 * | 11/2001 | Rao et al. .................. 700/98 |
| 7,346,593 | B2 * | 3/2008 | Takeuchi et al. ............ 706/12 |
| 7,401,041 | B2 * | 7/2008 | Goldfarb et al. ........... 705/36 R |
| 7,539,690 | B2 * | 5/2009 | Zhang ........................... 1/1 |
| 7,630,931 | B1 * | 12/2009 | Rachev et al. .............. 705/36 R |
| 2002/0123953 | A1 * | 9/2002 | Goldfarb et al. ........... 705/36 |
| 2003/0197136 | A1 * | 10/2003 | Yoshida ..................... 250/548 |
| 2004/0015458 | A1 * | 1/2004 | Takeuchi et al. ............ 706/14 |
| 2006/0095888 | A1 * | 5/2006 | Li et al. .................... 716/20 |
| 2007/0162372 | A1 * | 7/2007 | Anas ......................... 705/35 |
| 2008/0167889 | A1 * | 7/2008 | Kagarlis et al. ............ 705/1 |
| 2008/0167941 | A1 * | 7/2008 | Kagarlis et al. ............ 705/10 |
| 2008/0168001 | A1 * | 7/2008 | Kagarlis ................. 705/36 R |
| 2008/0168002 | A1 * | 7/2008 | Kagarlis et al. .......... 705/36 R |
| 2008/0168004 | A1 * | 7/2008 | Kagarlis et al. .......... 705/36 R |
| 2010/0228657 | A1 * | 9/2010 | Kagarlis ..................... 705/35 |
| 2011/0264573 | A1 * | 10/2011 | Kagarlis et al. ............ 705/35 |
| 2011/0320328 | A1 * | 12/2011 | Kagarlis ..................... 705/35 |
| 2012/0066022 | A1 * | 3/2012 | Kagarlis et al. ........... 705/7.29 |

OTHER PUBLICATIONS

Reed and Jorgensen, "The Double Pareto-Lognormal Distribution—A New Parametric Model for Size Distributions" (Oct. 2003).*
Reed, William J., "The Pareto Law of Incomes—an Explanation and an Extension," 1-37 (May 1999. Revised Jul. 2000).*
"S&P/Case—Shiller®Home Price Indices: Technical Description," MacroMarkets LLC (2006).*
Shiller, Robert J., "Comments on session 'Aggregation issues,'" BIS Papers No. 21,336-339.*

* cited by examiner

*Primary Examiner* — Narayanswamy Subramanian
(74) *Attorney, Agent, or Firm* — Davidson, Davidson & Kappel, LLC

(57) ABSTRACT

The present invention describes a computer-based method comprising representing transactions involving assets that share a common characteristic, as respective data points associated with values of the assets, the data points including transaction value information, determining parameters that fit probability density functions to at least one component of a value spectrum of the data points, the probability density function for at least one of the components comprising a power law, the parameters not including an offset parameter representing possible shifts in the value spectrum over time, and forming an index of values associated with the assets using at least one of the determined parameters.

9 Claims, 22 Drawing Sheets

Figure 1:
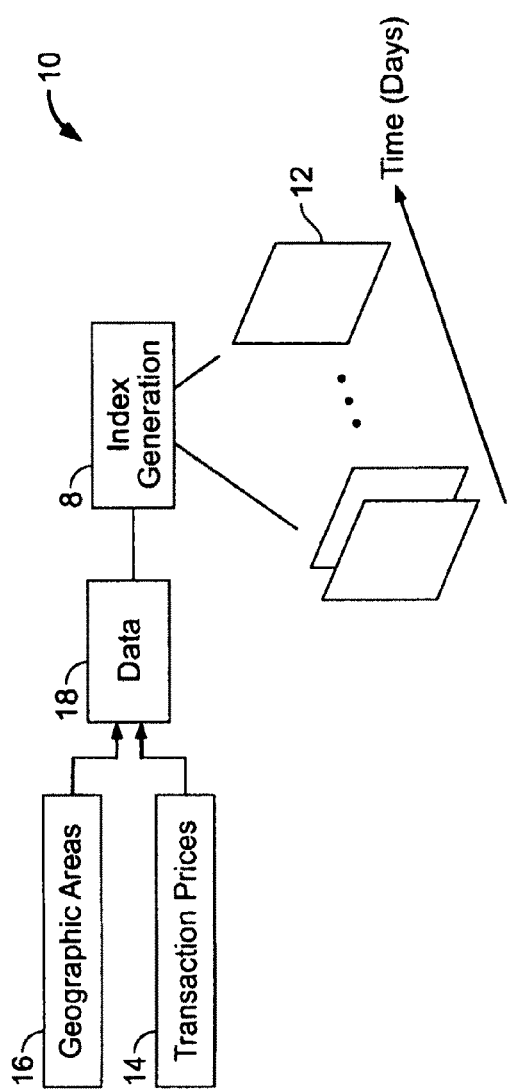

| | Comm. Lenders | Financial Service Firm | Home Builder | CMBS | REIT | Hedge Fund/ Pvt Eqty Fnd | RE Developers | Speculators | RE Broker | Individuals | Land Owner | Pension Fund | Insurance Comp. |
|---|---|---|---|---|---|---|---|---|---|---|---|---|---|
| Monetary Gain | | x | | | x | x | x | x | | | x | | |
| Term Investments | | x | | | x | | x | | | x | x | x | x |
| Portfolio Management | x | x | x | x | x | | x | | | | x | x | x |
| Risk Management | x | x | x | x | x | | x | | | x | x | | x |
| Volatility Trading | x | x | | x | | x | x | x | | | | | |
| Cost of Capital | x | x | x | x | | | | x | | | | | |
| New Products | x | x | x | | | | x | | x | | x | | x |
| Project Management | | x | x | | | | x | | | x | x | | |
| Earning Management | x | x | x | | x | | x | | | | | | |

FIG. 14

| COMMERCIAL LENDERS | | | | | | | |
|---|---|---|---|---|---|---|---|
| | Prop Trader | Asset Mgmt | Fixed Inc. | Equities | Invst Bank | Capital Markets | Real Estate |
| Monetary Gain | | | | | | | |
| Term Investments | | | | | | | |
| Portfolio Management | | x | | | | | x |
| Risk Management | | x | | | | | x |
| Volatility Trading | | | | | | | |
| Cost of Capital | | x | | | | | |
| New Products | | | | | | | |
| Project Management | | | | | | | x |
| Earning Management | | x | | | | | x |

FIG. 15

| FINANCIAL SERVICES | | | | | | | |
|---|---|---|---|---|---|---|---|
| | Prop Trader | Asset Mgmt | Fixed Inc. | Equities | Invst Bank | Capital Markets | Real Estate |
| Monetary Gain | self | self | | | | | self |
| Term Investments | | self | institutional | institutional | | | self |
| Portfolio Management | | self | institutional | institutional | | | self |
| Risk Management | self | self | institutional | institutional | | | self |
| Volatility Trading | self | | institutional | | | | |
| Cost of Capital | | | | | corporate clients | | self |
| New Products | self | self | institutional | institutional | | corporate clients | self |
| Project Management | | | | | | | self |
| Earnings Mgmt | | | | | | | self |

FIG. 16

| CMBS | Prop Trader | Asset Mgmt | Fixed Inc. | Equities | Invst Bank | Capital Markets | Real Estate |
|---|---|---|---|---|---|---|---|
| Monetary Gain | | | | | | | |
| Term Investments | | | | | | | |
| Portfolio Management | | | | | | x | |
| Risk Management | | | | | | x | |
| Volatility Trading | | | | | | | |
| Cost of Capital | | | | | | | |
| New Products | | | | | | x | |
| Project Management | | | | | | x | |
| Earning Management | | | | | | x | |

FIG. 17

| HOME BUILDERS | Prop Trader | Asset Mgmt | Fixed Inc. | Equities | Invst Bank | Capital Markets | Real Estate |
|---|---|---|---|---|---|---|---|
| Monetary Gain | | x | | | | | |
| Term Investments | | x | | | | | |
| Portfolio Management | | x | | | | | |
| Risk Management | | x | | | | | |
| Volatility Trading | | | | | | | |
| Cost of Capital | | x | | | | | |
| New Products | | x | | | | | |
| Project Management | | x | | | | | |
| Earning Management | | x | | | | | |

FIG. 18

| REIT | Prop Trader | Asset Mgmt | Fixed Inc. | Equities | Invst Bank | Capital Markets | Real Estate |
|---|---|---|---|---|---|---|---|
| Monetary Gain | | x | | | | | |
| Term Investments | | x | | | | | |
| Portfolio Management | | x | | | | | |
| Risk Management | | x | | | | | |
| Volatility Trading | | | | | | | |
| Cost of Capital | | x | | | | | |
| New Products | | | | | | | |
| Project Management | | | | | | | |
| Earning Management | | x | | | | | |

FIG. 19

| HEDGE FUND/ PRIVATE EQUITY FUND | | | | | | | |
|---|---|---|---|---|---|---|---|
| | Prop Trader | Asset Mgmt | Fixed Inc. | Equities | Invst Bank | Capital Markets | Real Estate |
| Monetary Gain | x | | | | | | |
| Term Investments | x | | | | | | |
| Portfolio Management | x | | | | | | |
| Risk Management | x | | | | | | |
| Volatility Trading | | | | | | | |
| Cost of Capital | | | | | | | |
| New Products | | | | | | | |
| Project Management | x | | | | | | |
| Earning Management | x | | | | | | |

FIG. 20

January 31, 2007

Boston: $xx.xx

New York: $xx.xx

Los Angeles: $xx.xx

Chicago: $xx.xx

Philadelphia: $xx.xx

Denver: $xx.xx

St. Louis: $xx.xx

Please make your selections below:

| METRO AREA | FUNCTION | TIME PERIOD |
|---|---|---|
| Boston<br>New York<br>Los Angeles<br>Chicago<br>Philadelphia<br>Denver<br>St. Louis | Chart Index:<br>–With Transaction Volume<br>–Without Transaction Volume<br>Compare Index | 1 Year<br>3 Year<br>5 Year |

Submit

FIG. 21

Please make your selections below:

METRO AREA
- Boston
- New York
- Los Angeles
- Chicago
- Philadelphia
- Denver
- St. Louis
- RL National Composite Index

FUNCTION
- Chart Index
  - --With Transaction Volume
  - --Without Transaction Volume
- Compare Index with:
  - --Other Metro Areas
  - --10 Year Treasury
  - --Shiller Indices
  - --Nasdaq
  - --S&P 500
  - --OFHEO
  - --NAR
  - --REIT Indices
  - --Housing Stocks
  - --Other Finance Indicators

TIME PERIOD
- 5 Day
- 30 Day
- 90 Day
- 1 Year
- 3 Year
- 5 Year

INDEX VALUE
- 1-Day
- 7-Day
- 28-Day
- Change from Prior Month
- Change from Prior Quarter
- Change from prior Year Submit January 31, 2007

Boston: $xx.xx

New York: $xx.xx

Los Angeles: $xx.xx

Chicago: $xx.xx

Philadelphia: $xx.xx

Denver: $xx.xx

St. Louis: $xx.xx

FIG. 22

January 31, 2007

Boston: $xx.xx

New York: $xx.xx

Los Angeles: $xx.xx

Chicago: $xx.xx

Philadelphia: $xx.xx

Denver: $xx.xx

St. Louis: $xx.xx

Please make your selections below:

METRO AREA
- Boston
- New York
- --Manhattan
- ----Upper east Side
- ----Upper West Side
- ----Midtown East
- ----Midtown West
- ----Chelsea
- ----West Village
- ----SoHo
- ----Tribeca
- --Long Island

OR ENTER ZIP CODE [       ]

CUSTOM SUB-INDEX
- (none)
- Price Per Square Foot (PPSF)
- --$0-$100
- --$101-$299
- --$300-$399
- --400-$499
- --$500 and over
- Sales Price
- --less than $100,000
- --$100,000-$499,00
- --$500,000-$999,999
- --$1,000,000-$1,999,999
- --$2,000,000 and over
- Square Footage

CUSTOM SUB-INDEX
- Chart Index
- --With Transaction Volume
- --Without Transaction Volume
- Compare Index with:
- --Other Metro Areas
- --10 Year Treasury
- --Shiller Indices
- --Nasdaq
- --S&P 500
- --OFHEO
- --NAR
- --REIT Indicies
- --Housing Stocks
- --Other Finance Indicators

TIME PERIOD
- 5 Day
- 30 Day
- 90 Day
- 1 Year
- 3 Year
- 5 Year
- Custom

INDEX VALUE
- 1-Day
- 7-Day
- 28-Day
- Change from Prior Month
- Change from Prior Quarter
- Change from prior Year
- Custom

ADD COMPARISONS
- (none)
- Financial Benchmarks
- Economic Indicators
- --2-Year Treasury
- --10 Year Treasury
- --DJIA
- --ABS (TDB)
- Other Housing Indices

[Submit]

FIG. 23

PRICE INDEXING

This application is a continuation of and claims the benefit of priority from U.S. application Ser. No. 11/674,467 filed Feb. 13, 2007 which is a continuation in part of and claims the benefit of priority from U.S. application Ser. No. 11/620,417 filed Jan. 5, 2007, the entire disclosure of both applications is incorporated by reference herein.

This description relates to price indexing.

A wide variety of real estate indexing methods exist, for example. Summary indexes report simple statistics (mean or median) of current transactions. Total return indexes like the NCREIF NPI report returns on capital using properties' appraised values and cash flows. Hedonic indices control for quality by using data on particular attributes of the underlying property. Hybrid methods also exist.

Repeat sales methods, which are widely used, have also attracted analysis. Various refinements yield different portfolio weightings or measures of appreciation (e.g. arithmetic vs. geometric), improve robustness, and weight to correct for data quality. A variety of potential issues have been noted, particularly sample reduction, non-random sampling, revision bias or volatility, uncorrected quality change (e.g. depreciation in excess of maintenance), and bias from cross-sectional heteroskedasticity. Hedonic and hybrid methods avoid the nonrandom sampling problems inherent in repeat sales, but have strong data requirements that in practice impose similar sample size reductions and as a result limit the potential temporal resolution of the index to monthly or quarterly in practice.

Power laws have been widely observed in nature, and particularly in such phenomena as financial market movements and income distribution. Pareto's Law in particular was proposed as an empirical description of an apparent "80/20" distribution of wealth. In real estate, Kaizoji & Kaizoji observe power law behavior in the right tail of the real estate price distribution in Japan, and propose that real estate bubbles burst when the slope of the tail is such that the mean price diverges. Kaizoji observes similar power law behavior in the right tail of assessed real estate values and asymmetric upper and lower power law tails in relative price movements. A variety of generative models have been proposed for power law and lognormal distributions of income and property values, many of which are discussed by Mitzenmacher. In particular, double-tailed power law distributions can arise as the result of random stopping or "killing" of exponentially growing processes. Andersson et al. develop a scale-free network model of urban real estate prices, and observe double-tailed power law behavior in simulations and data for Sweden.

In a somewhat different vein, Sornette et al. explain financial bubbles in terms of power law acceleration of growth, and observe the super-exponential growth characteristic of bubbles in some real estate markets.

Real estate transaction data generally is available infrequently, tending to be published monthly, quarterly or semi-annually. Sales transaction volumes fluctuate over time, may be subject to seasonal effects, and vary across geographical areas. Each property is unique, and not necessarily comparable to other individual properties within a market or within other geographic areas. Public source records have inconsistencies due to the many local jurisdictions involved and their varying data processing standards.

Additional information about the use of indexes of real estate values in connection with trading instruments is set forth in United States patent publications 20040267657, published on Dec. 30, 2004, and 20060100950, published on May 11, 2006, and in international patent publications WO 2005/003908, published on Jan. 15, 2005, and WO 2006/043918, published on Apr. 27, 2006, all of the texts of which are incorporated here by reference.

SUMMARY

In general, in an aspect, transactions involving assets (for example, real estate assets) that share a common characteristic are represented as respective data points associated with values of the assets, the data points including transaction value information. Parameters are determined that fit probability density functions to at least one component of a value spectrum of the data points. The probability density function for at least one of the components comprises a power law. The parameters do not include an offset parameter representing possible shifts in the value spectrum over time. An index is formed of values associated with the assets using at least one of the determined parameters.

Implementations may include one or more of the following features. The data points that are excluded are associated with values that are outside defined cutoffs. The defined cutoffs include a lower cutoff that is a function of a minimum value of any of the data points. The defined cutoffs include an upper cutoff that corresponds to a maximum value of any of the data points.

In general, in an aspect, transactions involving assets that share a common characteristic are represented as respective data points associated with values of the assets, the data points including transaction value information. Parameters are determined that fit probability density functions to at least one component of a value spectrum of the data points. The probability density function for at least one of the components comprises a power law. A median derived from the fitted probability density function is provided as an index of values associated with the assets using at least one of the determined parameters.

In general, in an aspect, representing transactions involving assets that share a common characteristic are represented as respective data points associated with values of the assets, the data points including transaction value information. Parameters are determined that fit probability density functions to at least one component of a value spectrum of the data points. The probability density function for at least one of the components comprises a power law. The parameters are separated into parameters that characterize a shape of the probability density function but not its position and at least one parameter that characterizes its position but not its shape. An index of values associated with the assets is formed using at least one of the determined parameters.

Implementations may include one or more of the following features. A single parameter characterizes the position of the probability distribution function. The shape parameters are fit using data for many days, and the single position parameter is fit using data for a single day.

In general, in an aspect, transactions that involve assets that share a common characteristic are represented as a set of respective data points associated with values of the assets, the data points including transaction value information. The set of data points suffices to form an index of the values of the assets, using parameters that are determined by fitting probability density functions to at least one component of a value spectrum of the data points, the parameters including at least one shape parameter determined by fitting data over multiple days and at least one position parameter determined by fitting data either over a single day or multiple days, the probability density function for at least one of the components comprising a power law. A subindex is formed of values of the assets that are associated with a subset of fewer than all of the data points of the set, the subset being selected to represent a range of one or more of a demographic, geographic, value, or other attribute of the transactions.

Implementations may include one or more of the following features. Parameters are determined that fit probability density functions to at least one component of a value spectrum of a subset of the data points. The subindex is formed by determining parameters that fit probability density functions to at least one component of a value spectrum of the subset of data points. The subindex comprises an approximation based on scaling the index of the set by a ratio of medians of, respectively, the subset of values associated with the subindex and the set of values associated with the index. The subindex comprises an approximation based on scaling the index of the set by a ratio of the means of, respectively, the subset of values associated with the subindex and the set of values associated with the index.

These and other aspects and features, and combinations of them, can be expressed as methods, apparatus, program products, means for performing functions, systems, and in other ways.

Other aspects and features will become apparent from the following description and from the claims.

DESCRIPTION

Figure 2:
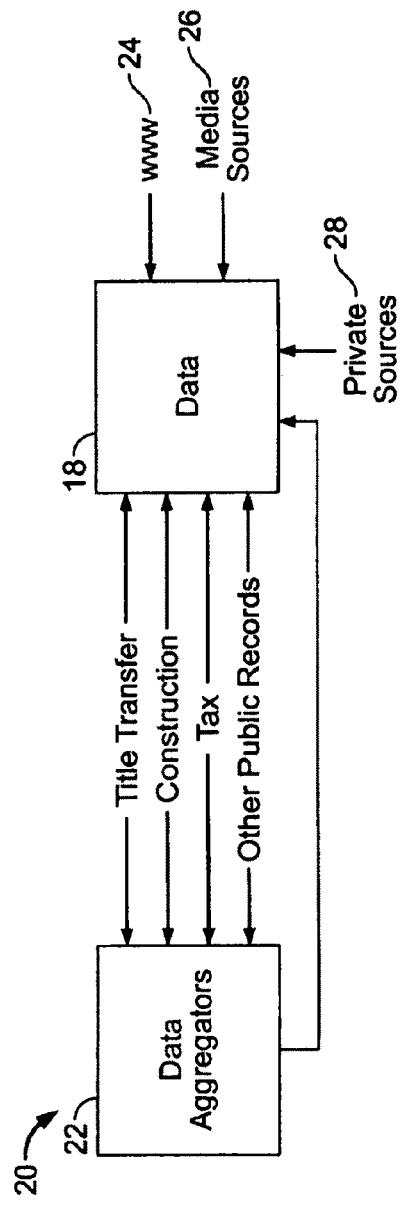
Figure 3:
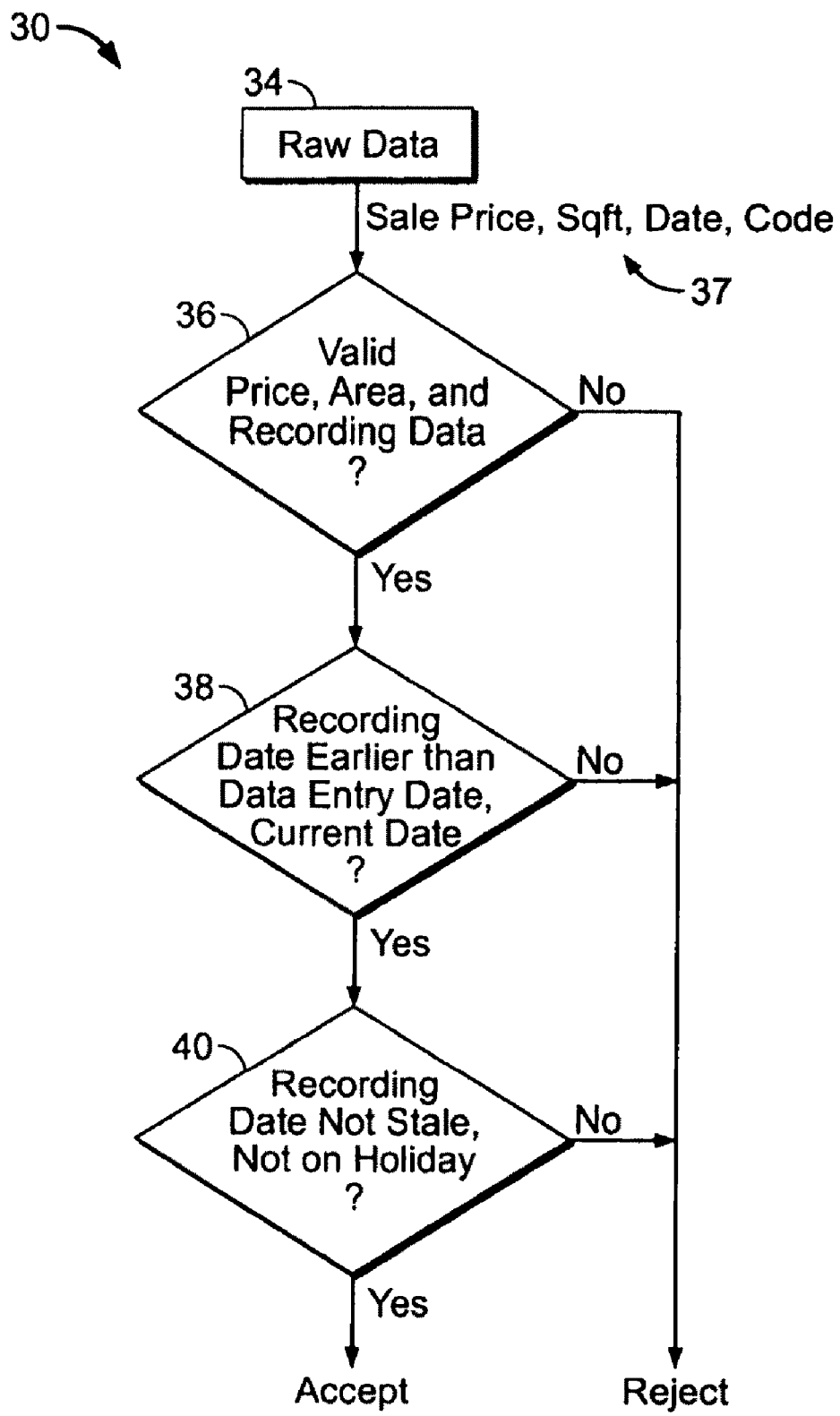
Figure 4:
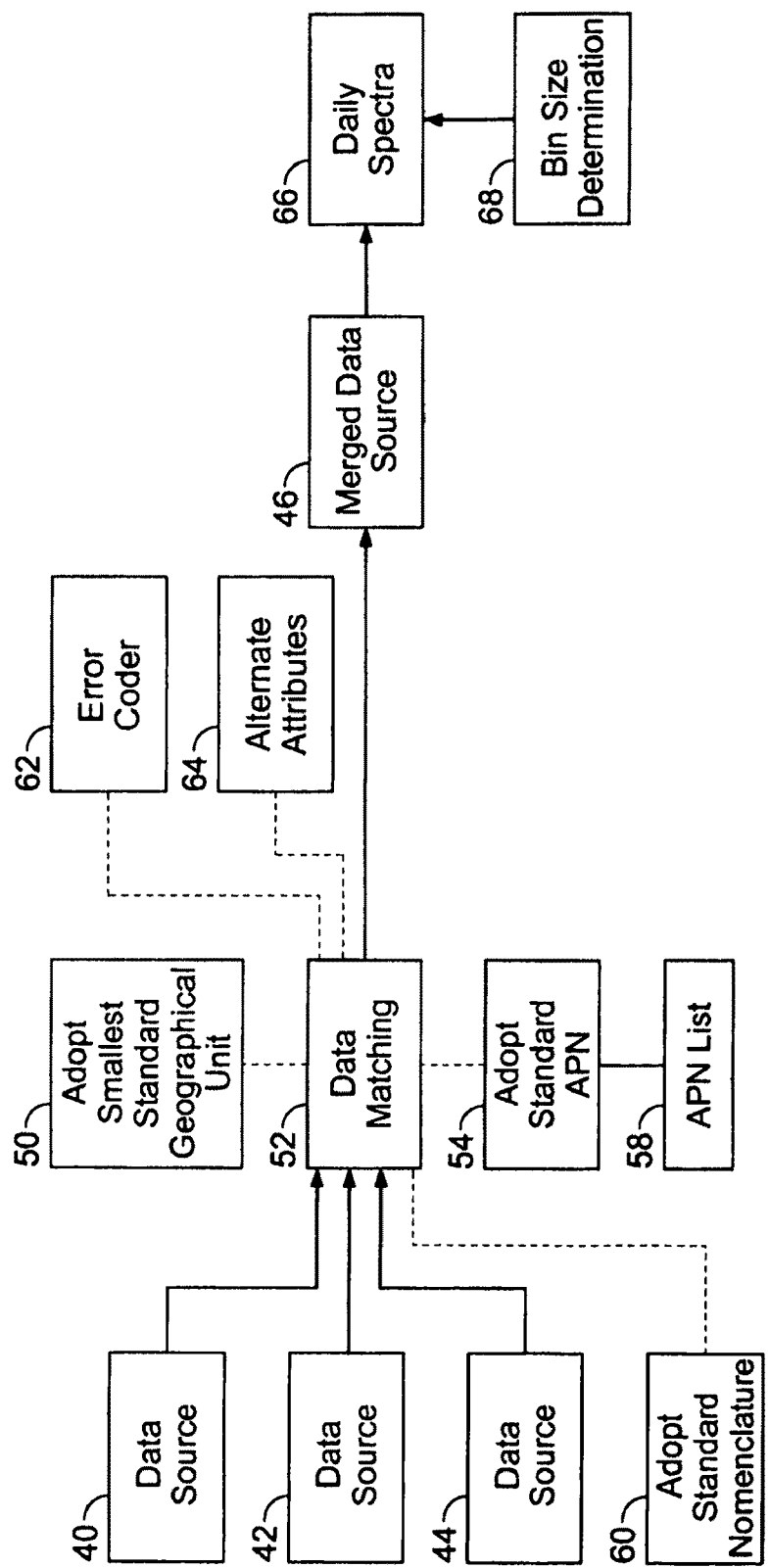
Figure 10:
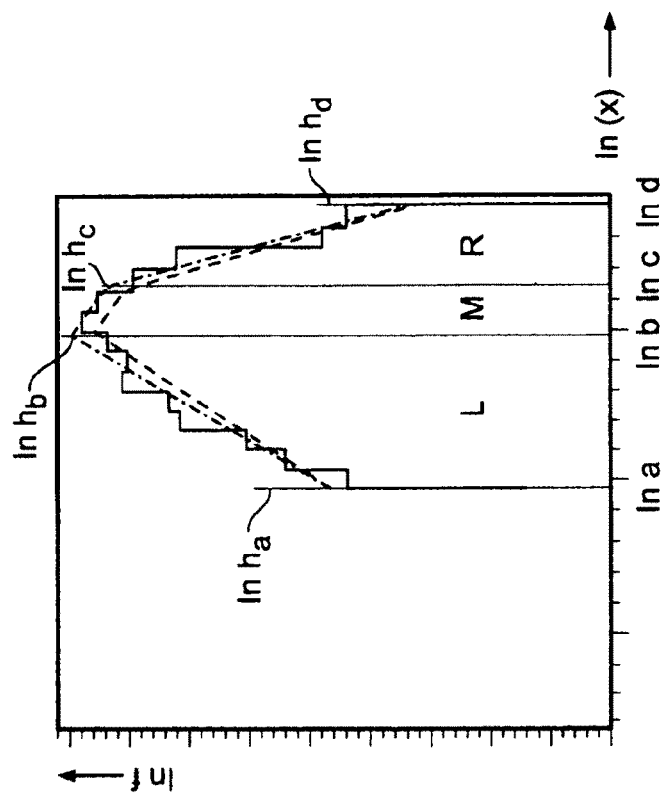
Figure 11:
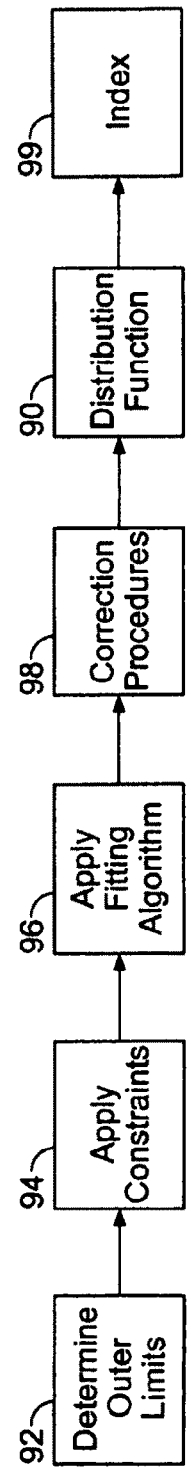
Figure 12:
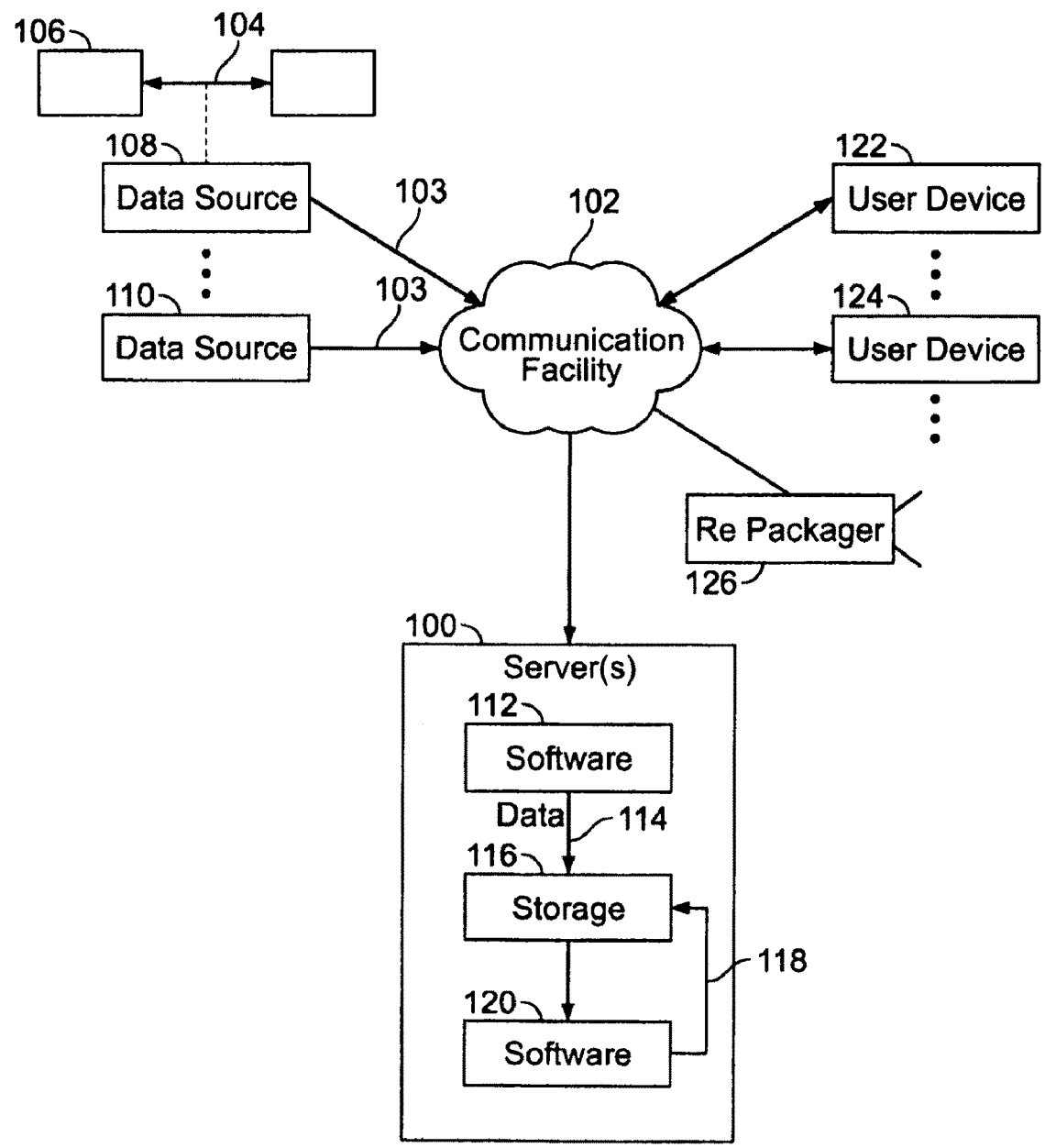
Figure 24A:
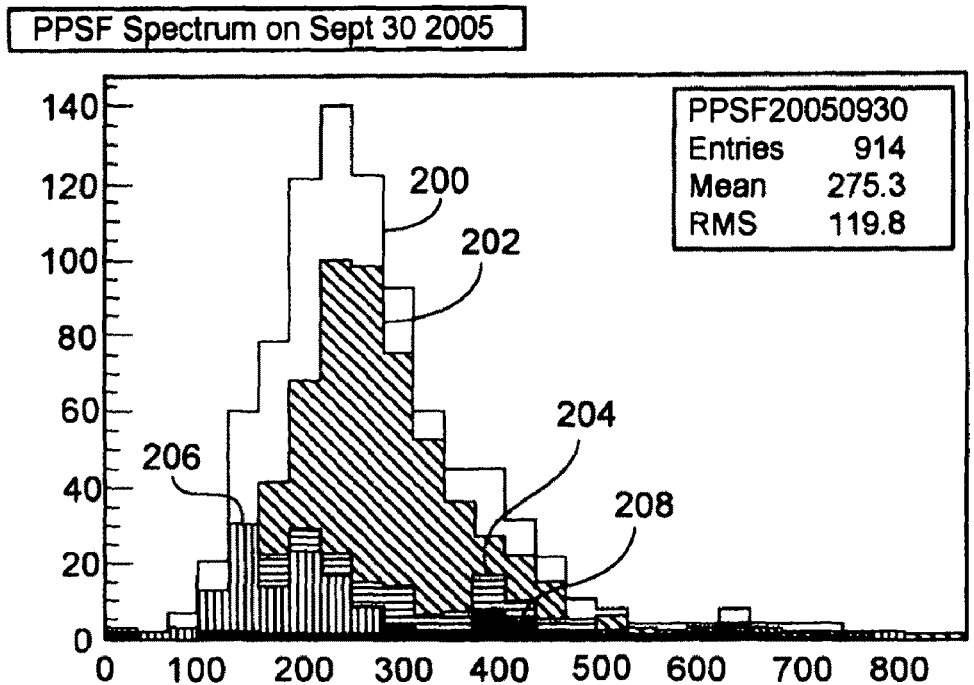
Figure 24B:
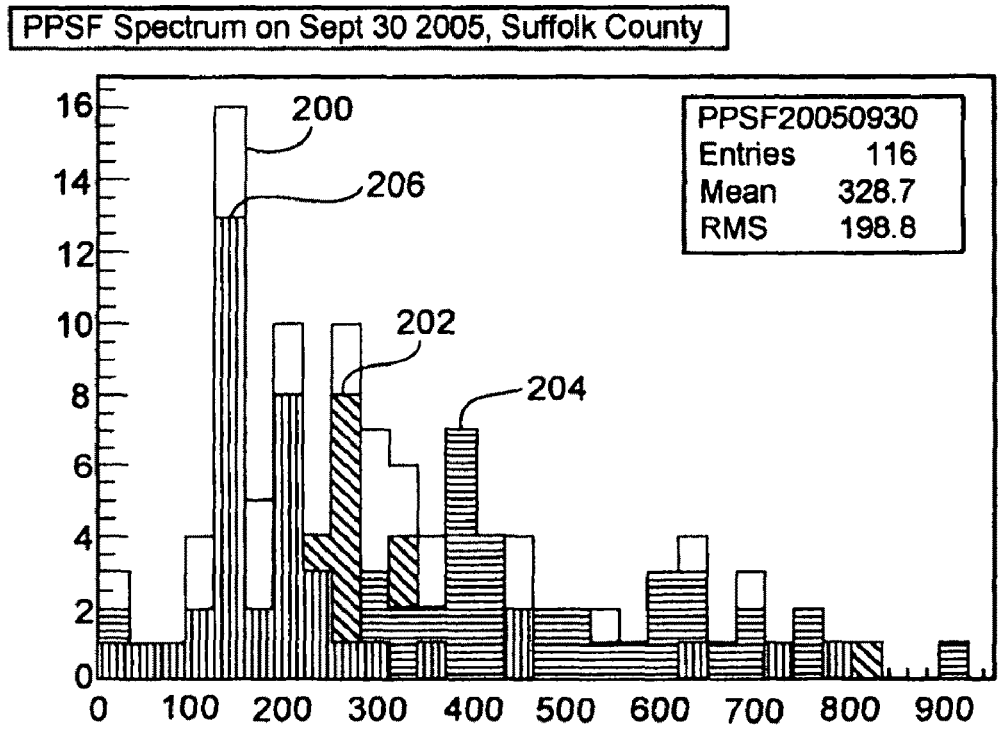

FIGS. 1, 2, and 12 are block diagrams
FIGS. 3, 4, and 11 are flow diagrams
FIGS. 5A, 5B, 6, 7 are histograms.
FIGS. 8A, 8B, and 9A, 9B, 9C, and 9D are graphs.
FIG. 10 is a probability density function.
FIGS. 14-20 are charts.
FIGS. 13, and 21-23 are screen shots.
FIGS. 24A and 24B are spectra.

As shown in FIG. 1, one goal of what we describe here is to generate 8 a data-based daily index in the form of a time series 10 of index values 12 that capture the true movement of residential real estate property transaction prices per square footage 14 in geographical areas of interest 16 (Note: although we have focused on residential properties, it is reasonable to assume that the same methods can have far wider application, e.g., in real estate and other transactions generally). The index is derived from and mirrors empirical data 18, as opposed to hypotheses that cannot be directly verified; is produced daily, as opposed to time-averaged over longer periods of time; is geographically comprehensive, as opposed to unrepresentative; and is robust and continuous over time, as opposed to sporadic.

The former two criteria are motivated by the understanding that typical parties intending to use a real estate index as a financial instrument would regard them as important, or even indispensable. These two requirements imply a range of mathematical formulations and methods of analysis that are suitable, and have guided the computational development of the index.

The latter two criteria aim at maximizing the utility of the index by providing a reliable, complete, continuous stream of data. These two requirements suggest multiple and potentially redundant sourcing of data.

Additionally, the index may use all the available data; remain robust in the face of abrupt changes in market conditions; give reliable results for low-volume days with sparse, scattered transactions; and maintain reliability in the presence of error, manipulation and statistical outliers.

The methodology developed for the computation of the index is designed to satisfy these additional criteria and produce a benchmark suited for creating and settling financial derivatives despite limitations associated with the availability and quality of real estate transaction data.

The index can be published for different granularities of geographical areas, for example, one index per major metropolitan area (e.g., residential Metropolitan Statistical Areas), typically comprising several counties, or one index per county or other sub-region of a metropolitan area where commercial interest exists.

Two alternative metrics for the index may be the sale price of a house (price), and the price per square foot (ppsf). The latter may be superior to the extent that it has a clearer real-world interpretation, is comparable across markets, and normalizes price by size, putting all sales on a more equal footing. Specifically, to characterize the real estate transactions occurring in an area, a measure is needed that allows comparing small and large homes. Simply looking at the prices at which an existing house changes hands is limited by the information it ignores. Further, the uniformity of the asset value is not guaranteed as renovations may have occurred; the length of time between transactions is variable; and it may not be possible to include new home sales.

The ppsf of a house, on the other hand, tends to make transactions comparable. Characterization by ppsf generally is an accepted practice in commercial real estate, used by most builders, and, less formally, by those in the market for a new home. From a trading perspective, this makes transactions more similar, but unlike a more fungible commodity such as oil, there are often still differences between houses.

In the description provided here, we focus on an index that tracks the movement of ppsf, where $$ppsf = \frac{price}{area} \text{ in units of } \frac{\$}{ft^2}$$

Intuitively one might think of a ppsf index as a share, with each home sale representing a number of shares equal to its area. Such an interpretation would imply weighting ppsf data by square footage in the derivation of the index, although weighting by value is more common in investment portfolios.

Experiments with these weightings indicate that they introduce noise and amplify volatility, so some implementations of our techniques do not use them. Here we focus on indices that are unweighted indices. Mathematically this is equivalent to attributing weight 1 to each ppsf value, or attributing to each sale the same importance.

Non Parametric and Parametric Indices

Possible indices for tracking the ppsf of home sales include non-parametric and parametric indices.

Non parametric indices state simple statistical facts about a data sample without the need for a representation of the probability density function of that sample. They can be derived readily and are easy to understand, but tend not to reveal insights as to the nature or statistics of the underlying dynamics. Non-parametric indices include the mean, area-weighted mean, median, area-weighted median, value-weighted mean, value-weighted median, and the geometric mean derived directly from a dataset without prior knowledge of the distribution function that has generated the data. Of the non parametric indices, the median is a good one and is discussed further below.

Parametric indices require a deeper understanding of the underlying statistics, captured in a data driven parameterization of the probability density function of the data sample. Parametric representations are more complex than non-parametric ones, but successful parametric representations can reveal predictive insights. We have explored numerous parameterizations of the ppsf probability density function and believe, on the basis of empirical evidence, that the data conform to what we have termed the Triple Power Law (TPL) discussed later. We note that TPL itself is a probability density function (PDF), not an index. We have explored parametric indices that derive from it and discuss them further below.

Various algorithms can be used to fit the TPL parameters to the data. Below we discuss two, namely least-squares fits of data aggregated in histograms, and maximum likelihood fits of individual data points. While the latter works especially well, the former serves as a useful example of alternative, albeit cruder ways of getting to the TPL.

Employing the TPL parameterization we derive the mean, median and mode of the probability density function. Though these are standard statistical measures for some of which we have also considered non-parametric counterparts as indicated above, their derivation using the TPL PDF makes them parametric. Each has merits and disadvantages which we will discuss.

Moreover we describe below how we derive a non-standard (parametric) blend of a mean and a median over a sector of our TPL PDF, one which represents the mainstream of the housing market. We will refer to them as the Nominal House Price Mean and Median (where price is used as an abbreviation for price per square foot).

Applications

The technology described here and the resulting indices (which together we sometimes call the index technology) can be used for a wide variety of applications including the creation, execution, and settlement of various derivative financial instruments (including but not limited to futures, swaps and options) relating to the underlying value of real estate assets of various types in various markets.

Real estate types include but are not limited to residential property sales, residential property leases (including whole ownership, fractional ownership and timeshares), commercial property sales, commercial property leases, industrial property sales, industrial property leases, hotel and leisure property sales, hotel and leisure property room rates and occupancy rates, raw land sale and raw land leases, vacancy rates and other such relevant measures of use and or value.

Underlying values include but are not limited to units of measure for sale, such as price per square foot and price per structure by type or class of structure and lease per square foot for various different time horizons.

The index technology can be used for various analytic purposes pertaining to the different investment and trading strategies that may be employed by users in the purchase and sale or brokerage of such purchases and sales of the derivative instruments developed. The index technology can be used in support of actual exchanges, whether public or private, and the conduct of business in such exchanges with regard to the derivative products.

The index technology can be used for the purpose of creating what is commonly referred to as structured investment products in which some element of the return to investors is determined by the direct or relative performance of an index determined by the index technology either in relation to itself, other permutations of the index or other existing or invented measures of financial and economic movement or returns.

The index technology can be used for the purpose of analytics of specific and relative movements in economic and unit values in the areas for which the index is produced as well as various sub-sets of either the areas or the indexes, on an absolute basis as well as on a relative basis compared with other economic standards, measurements and units of value.

The index technology can be used to develop and produce various analytic functions as may be requested or provided to any party interested in broad or specific analytics involving the indexes or related units of measure. Such analytics may be performed and provided on a website, alliance delivery vehicles, and or forms of delivery including but not limited to written and verbal reports.

The index technology can be used in a variety of ways to support the generation of market research materials which may be delivered broadly or to specific recipients in a variety of forms including but not limited to web based vehicles and written or verbal reports and formats. Such analytics and research may be used in conjunction with interested parties in the production and delivery of third party analytics and research products and services as discussed above.

The index technology can be used to develop similar goods and services related to other areas of application beyond real property assets and values including but not limited to energy, wellness and health care, marketing and communications and other areas of interest for which similar Indexes could be applied.

The index technology can be used by a wider variety of users, including but not limited to commercial lenders, banks and other financial institutions; real estate developers, owners, builders, managers and investors; financial intermediaries such as brokers, dealers, advisors, managers, agents and consultants; investment pools and advisors such as hedge funds, mutual funds, public and private investment companies, pension funds and the like; insurance companies, brokers, advisors and consultants; REIT's; government agencies, bodies and advisors and investors both institutional and individual, public and private.

In addition, the index technology can be used in relation to various investment management strategies, techniques, operations and executions as well as other commercial activities including but not limited to volatility trading; portfolio management; asset hedging; liability hedging; value management; risk management; earnings management; price insurance including caps; geographic exposure risk management; development project management; direct and indirect investments; arbitrage trading; algorithm trading; structured investment products including money market, fixed income and equity investment; structured hedging products and the like. FIGS. 14-20 show some of the uses of the index technology by various parties. In FIG. 14, for example, the left column lists types of analyses and uses for the index. The x's in the columns indicate uses that various categories of user could make of the index. FIGS. 15 through 20 show further details about each of some of the categories of users shown in FIG. 14.

Data Sources

As shown in FIG. 2, a wide variety of data sources and combinations of multiple data sources can be used as the basis for the generation of the indices. Any and all public records could be used that show any or all of the elements relating to the calculation of an index, including but not limited to title transfer, construction, tax and similar pubic records relating to transactions involving any type of real property. The data 18 can be obtained in raw or processed form from the original sources 20 or from data aggregators 22. Some data may be obtainable on the World Wide Web and from public or private media sources such as print, radio, and television.

Private sources 28 can include economic researchers, government agencies, trade organizations and private data collection entities.

Owners and users of real property; real estate, mortgage, financial and other brokers; builders, developers, consultants; and banks and other lending institutions or parties can all be potential sources of data.

Data Issues

Outliers

The derivation of a ppsf based daily index per metropolitan area requires collecting information on an ensemble of the home sales per day in that area.

Such collected data may contain outliers far out on the high and low ppsf end, sometimes due to errors, for example, a sale of an entire condominium complex registering as a single home sale, or non-standard sales, e.g., of discounted foreclosed properties, or boundary adjustments, or easements misidentified as real transactions. The index should be relatively insensitive to such anomalies.

There are various ways to deal with outliers. They can be omitted from the dataset, a practice we do not favor, or analyzed to have their origin understood. Some implementations will carefully preserve outliers for the useful information that they contain. They may be cross checked against other sources, and, to the extent they are due to human error, have their bad fields recovered from those complementary sources (e.g. false low price or large area inducing improbably low ppsf). Systematic data consistency checking and recovery across data sources and against tax records can be useful. Statistical approaches can be used that are relatively robust and insensitive in the presence of such errors.

Primary Data and Filtering

As shown in FIG. 3, in the data filtering process 30, data that are used for the derivation of an index include sale price, square foot area (area), the date a property changes hands (recording date), and the county code (Federal Information Processing Standards (FIPS) Code) 34.

The former two serve to calculate ppsf and the latter two fix the transaction time and geography.

Sales that omit the area, price, or recording date have to be discarded 36, unless they can be recovered in other ways.

Secondary Data Fields and Filtering

In principle, the above data fields 37 would suffice to specify fully a ppsf based index. In practice, inconsistencies of data may need to be cleaned and filtered with the aid of auxiliary fields. Home sales data that are aggregated from numerous local sources having disparate practices and degrees of rigor may be corrupted by human error and processing malpractices.

To enhance the integrity of the data, consistency checks can be applied to primary data using the date a sale transaction is entered in the database by the vendor (data entry date) and the date at which a dataset was delivered by the vendor (current date). Clearly, the recording date must precede both the data entry date and the current date 38.

Sales with recording dates that fail these consistency checks are discarded as are sales with recording dates preceding the data entry dates by more than two months (stale data) 40, because it will not be usable for a live index. Sales having recording dates corresponding to weekends or local holidays are also discarded 40. Such dates typically have so few transactions that no statistically meaningful conclusion can be reported.

Possible Data Recovery with Auxiliary Data

Instead of excluding such sales with one or more incorrect primary data fields, the latter may be recoverable from complementary data such as tax records.

Auxiliary fields that can be used for data recovery include a unique property identifier associated with each home (Assessor's Parcel Number APN). The APN can help to match properties across different data sources and cross check suspected misattributed data. However, APN formats vary both geographically and across time as well as across sources and are often omitted or false. Other attributes that could help uniquely identify a property, in the absence of reliable APNs, are the full address, owner name, a complete legal description, or more generally any other field associated with a sale that, by matching, can help unambiguously to identify a transaction involving a property.

Multiple APN Transactions

It may be possible to merge data from multiple sources by creating, for example, a registry of properties by APN per county, with cross references to all the entries associated with a property in either sale or tax assessor's records from any sources. Such a master registry, if updated regularly, would enable tracking inconsistencies across the contributing sources.

For the parametric index, in the event that the volume of outliers is low relative to that of mainstream events, procedures described later are robust to outliers and suspect points effectively, so that error recovery may have marginal effect. In general however the volume of apparent outliers is high, so that discarding them may be inappropriate and an effective method of error recovery can have a substantive impact on the computation of the index. In addition, the value of a master registry may be, for example, for security enhancement and operational fault tolerance.

A Merged Database

As shown in FIG. 4, multiple data sources 40, 42, 44, may include data linked with sale transactions and data linked with tax assessments. Generally, sales data comes from county offices and is relatively comprehensive, whereas tax data is obtained from the individual cities and uniform county coverage is not guaranteed. Both data sources can have missing or false data, at a rate that varies with the source, over time, and across geography.

Tax data can be used to identify and recover erroneous sales data, and to perform comparisons and consistency checks across data sources. Such a procedure could be developed into a systematic data matching and recovery algorithm resulting in a merged, comprehensive database that would be subsequently used as an authoritative data source for the computation of the index.

A merged data source 46 could be created using an object-oriented (OO) software architecture such as one can build using an OO programming language, e.g. C++. Variants can be devised that do not require OO capabilities, which replace an OO compatible file system with a relational database. Hybrids can as well be devised, utilizing both. A pseudo code overview of an example of an algorithm to build a merged data source is set out below. A variety of other algorithms could be used as well to perform a similar function.

One step in the process is to adopt 50 the smallest standard geographical unit with respect to which data are typically classified as the unit of reference. Because data matching 52 entails intensive searches over numerous fields, small geographical units will reduce the number of such searches (i.e., only properties and sales within a geographical unit will be compared).

Another step is to adopt 54 a standard APN (i.e., property ID) format. Various APN formats are in use. An updated list 58 of APN formats in use would be maintained and a software algorithm would read an APN in any known format and transform it into the standard format or flag it as unresolved.

Standard nomenclature 60 could be used for sale and tax data based on an updated list of names in use by various data sources. A software algorithm could read a name from one data source and transform it into the standard format or flag it as unknown.

Error codes 62 could be developed to flag missing or erroneous fields associated with sale or tax records. The codes, one for each of sale and tax assessment events, could each comprise a binary sequence of bits equal in number to that of the anticipated attributes. A bit is set to 1 if the field is in the right format (e.g. an integer where an integer is expected), or 0 for missing and unrecognized fields.

A list of alternate attributes 64 in order of priority could be specified to use in attempting to match or recover APN numbers across data sources. The attributes could include date to within ±time window tolerance (say 1 week), price to within ±price tolerance (say 1000 $), document number, property address, owner names, or full legal description.

A start time can be adopted for computing an index time series. Beginning at the start time, for each geographical unit of reference, a registry of properties by APN can be built.

Data from the start time onwards can be stored in the merged data source 46 as separate files (or databases) per geographical unit, using a tree for sale transaction events and another tree for tax assessment events. These files can be used as input for the procedures discussed below.

Unmatched Property Registry

This step generates a registry of properties with the addresses of all the relevant records pertaining to these properties whether from sales or tax assessment data. Missing or erroneous attributes are flagged but without attempting error recovery. The result is an APN-unmatched property registry to facilitate locating and retrieving information on any property per geographical unit. Here is the pseudo-code:

At the end of this stage one obtains an APN matched sales registry, having used up the tax assessment data.

Consolidated Sales Database

The objective of this stage is to consolidate the APN matched sales data of different sources into a merged sales database 46 to be used as the source for the computation of the index.

```
Initialize:
    Per standard geographical unit: create a separate Property Registry archive (file, DB etc);
        Per data vendor: create a data vendor tree in the archive;
            Per event type (sale or tax assessment): create an event type branch in the vendor tree;
                Per event type branch: create a Valid and an Invalid APN branch;
Loop:
    Per archive (file, DB etc):
        Per data vendor:
            Per event type:
                From the start time onwards:
                    Per event: read the APN;
                        if the APN is recognized:
                            if new: create a new APN branch in the Valid APN branch;
                        else: if the APN is flagged as unrecognized:
                            create a new APN branch in the Invalid APN branch;
                    Per valid or invalid APN respectively: create new leaves for and record
                        the timestamp (recording time);
                        the error code;
                        the address of the current event in the corresponding input file;
Finalize:
    Per archive (file, DB etc):
        Per data vendor branch:
            Per event type branch:
                For the Valid APN branch:
                    Per APN branch:
                        sort the leaves in ascending order of their timestamp;
```

As new data become available, one can develop a variant of the above procedure to use for updating an existing APN unmatched registry.

Unconsolidated, Matched Sales Registry

The objective of this stage is to use the tax assessor data to recover erroneous fields within the sales database of each individual vendor. This leads to an APN matched sales registry, without reconciliation yet of data across sources.

```
Initialize:
    Per standard geographical unit: create a separate Sales Registry archive (file, DB etc);
        Per data vendor: create a data vendor tree in the archive;
Loop:
    Per Property Registry (file, DB etc):
        Per data vendor branch:
            For the Sales event type branch:
                For the Valid APN branch:
                    Per APN branch:
                        create a clone in the Sales Registry;
                For the Invalid APN branch:
                    Per APN branch:
                        search for a match in the Valid APN branch of the corresponding Tax
                        Assessment event type branch, applying the matching criteria;
                            if the current APN cannot be matched: discard;
                            else:
                                if no branch exists for this APN in the Valid branch of the Sales
                                event type branch in the Sales Registry create one;
                                create new entry leaves and record
                                    the timestamp (recording time);
                                    the error code;
                                    the address of the current event in the input file
Finalize:
    Per Sales Registry (file, DB etc):
        Per data vendor branch:
            Per APN branch:
                sort the leaves in ascending order of their timestamp;
```

```
Initialize:
    Per standard geographical unit create a Radar Logic Sales Database (RLSD) archive (file, DB etc)
Loop:
    Per Sales Registry (file, DB etc):
        Per data vendor branch:
            Per APN branch:
                if no corresponding APN branch exists in the RLSD: create one;
                Per Sale entry:
                    apply the matching criteria to determine whether the current Sale entry in the
                    Sales Registry matches any of the Sale entries in the current APN branch of the
                    RLSD;
                        if there is no match;
                            create a new entry for the current Sale of the Sales Registry in the
                            current APN branch of the RLSD;
                            create attribute leaves;
                            retrieve fields for the attribute leaves from the input file referenced
                            in the Sales Registry if not flagged as erroneous;
                            fill the attribute leaves with the retrieved fields or flag them as
                            unresolved if no error free attribute value was found;
                        else:
                            identify unresolved attributes in the current RLSD Sale entry;
                            retrieve the respective fields from the input file referenced in the
                            Sales Registry;
                            if error free copy into the RLSD Sale attribute leaves, else leave
                            flagged as unresolved:
Finalize:
    Per RLSD (file, DB etc):
        Per APN branch:
            sort the Sale entry leaves in ascending order of their timestamp;
            discard sale entries with one or more error-flagged primary fields
```

At the end of this stage, a merged database has been obtained. Refinements to this scheme are possible, e.g. assigning merit factors to different data sources so that their respective fields are preferred versus those of other sources in case of mismatches.

Price Per Square Foot Spectra

Generation of Histograms

The cleaned ppsf data from the merged data source can be presented as daily spectra 66 in a form that is convenient to visualize, gain insights, and perform further analysis, for example, as histograms, specifically histograms of fixed bin size.

For a histogram of N bins (N an integer), the range of the variable of interest (here ppsf) is broken into N components each of width w in ppsf. To present the daily ppsf data of a certain geographical region as a histogram, for each sale one identifies the bin which contains its ppsf value and assigns to that bin a count for each ppsf value it contains. This amounts to assigning a weight of 1 to each sale, effectively attributing equal importance to each sale.

Alternatively, one might assign a different weight to each sale, for example, the area. In this case, the extent to which any particular sale affects the overall daily spectrum is proportional to the area associated with that sale. The recipe becomes: for each sale whose ppsf field is contained within a bin, add to that bin a weight equal to the area of that sale.

Other schemes of assigning weight are possible, e.g., by price, although our definition of ppsf and its intuitive interpretation as a share make the choice of area more natural. A price-weighted index would be more volatile and have no obvious physical interpretation.

Whether one weights the data in a histogram or not, as a practical matter one has to decide what bin size 68 to use. In the extreme of infinitesimally narrow bins (high resolution) one recovers the unbinned spectrum comprising all the individual data points. In the opposite low-resolution extreme, one can bunch all the ppsf values in a single bin and suppress all the features of the distribution.

If the number of bins is too high, in effect one attempts to present the data at a resolution which is finer than the statistics warrant. This results in spiky spectra with discontinuities due to statistical noise. On the other hand if the number of bins is too low, one suppresses in part the signal together with the noise and degrades the resolution of the actual data unnecessarily. To establish the number of bins which is appropriate for a given ppsf dataset we apply the following procedure:

Calculate the mean ppsf of a dataset of N sale events ($\overline{ppsf}$).

Calculate the standard deviation of ppsf for the same dataset ($\sigma$).

Establish the number N' of sales i in this dataset with $ppsf_i$ in the range $\overline{ppsf}-3\sigma \leq ppsf_i \leq \overline{ppsf}+3\sigma$.

The Poisson noise over that range is $\sqrt{N'}$ and we require bins to contain on average this many counts. Distributing N' counts to bins with content $\sqrt{N'}$ requires approximately $1+int(\sqrt{N'})$ bins over the $6\sigma$ range, rounded to the nearest upward integer. Thus the recommended bin size is $$w = \frac{6\sigma}{1+int(\sqrt{N'})}$$

Establish the maximum and minimum of the dataset ($ppsf_{min,max}$)

Use $$N_{bins} = 1 + int\left(\frac{ppsf_{max} - ppsf_{min}}{w}\right)$$

as number of bins over the entire range

To understand the rationale, note that the null hypothesis for the distribution of the data is that it was produced by chance alone. If this were the case, for discrete events such as home sales Poisson statistics would apply. We adopt this hypothesis for the purpose of estimating a bin size. The daily ppsf data include outliers in the low and high ppsf tails which are highly unlikely for Poisson statistics outside of the $\overline{ppsf}\pm3\sigma$ range. Hence we retain data in this range only for this estimate. The noise threshold under these assumptions is the square root of the total count in the retained range. Within a bin, different values of a variable are indistinguishable. Likewise, within statistical noise different values of a variable are indistinguishable.

Hence we estimate the bin size by setting it equal to the statistical noise threshold. As the matching number of bins we then use the nearest upward integer of the full range divided by the estimated bin width.

$$N_{bins} = 1 + \text{int}\left(\frac{ppsf_{max} - ppsf_{min}}{w}\right)$$

Figure 5B:
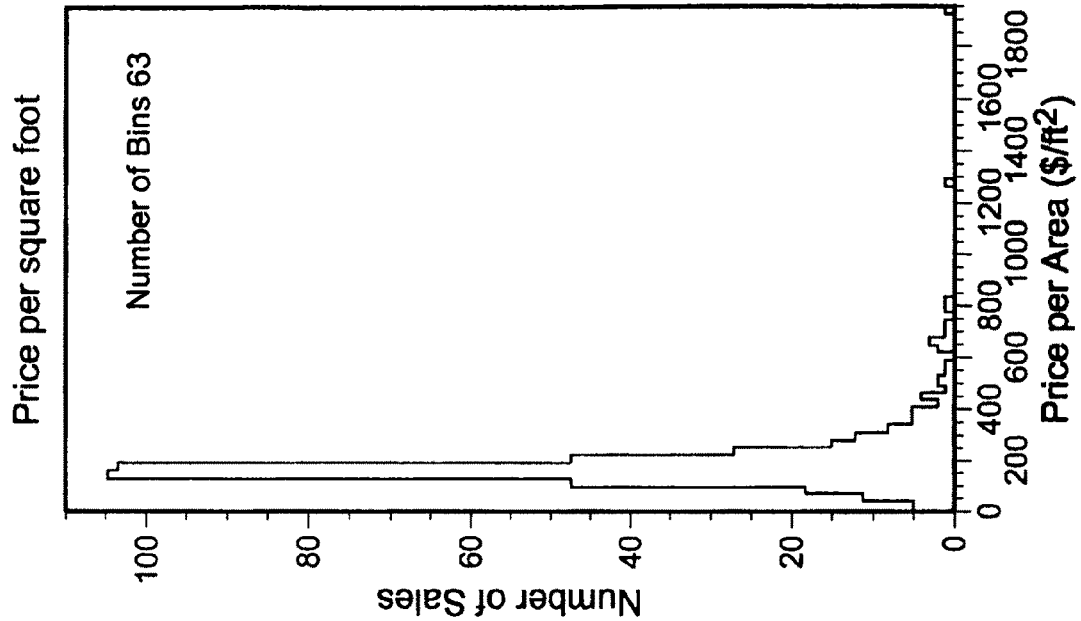
Figure 5A:
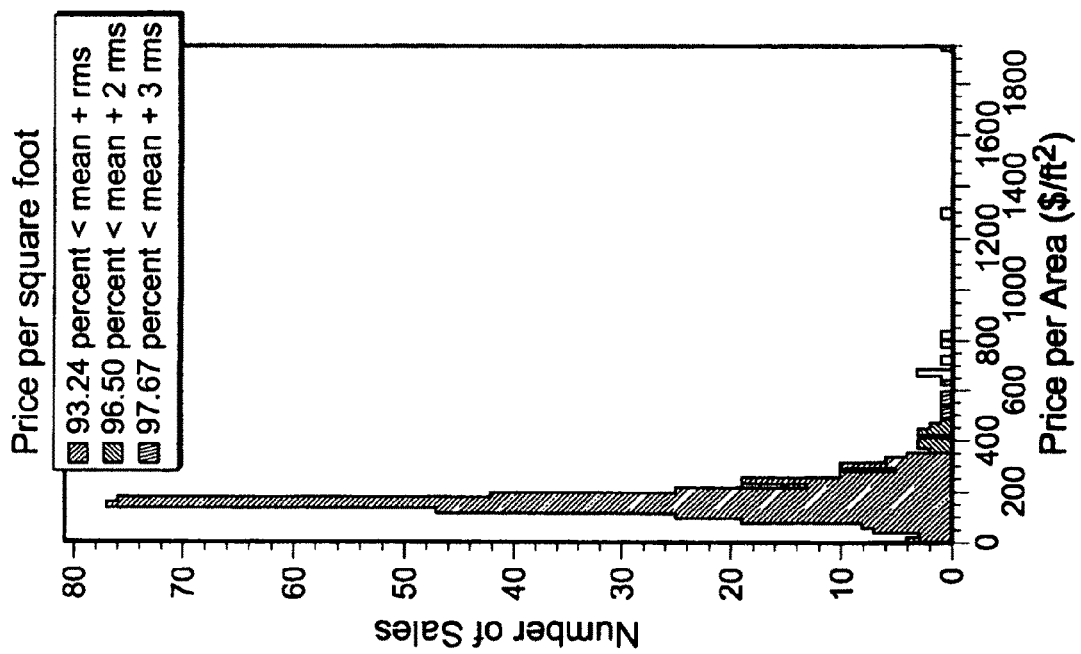

FIGS. 5A and 5B show examples of ppsf spectra (a) having an arbitrary number of 100 bins, which here is too high and yields spiky spectra, and (b) having 63 bins determined as explained above, which represents the "natural" resolution of the corresponding dataset.

Figure 6:
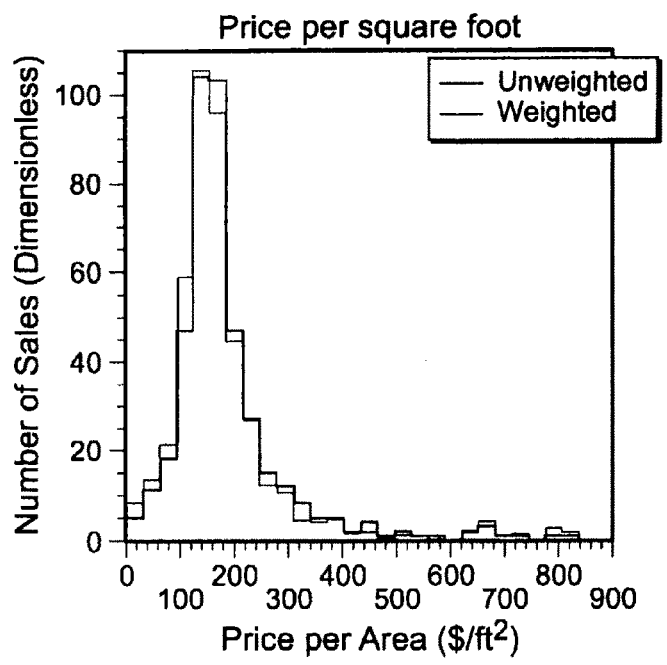

FIG. 6 shows a typical unweighted ppsf spectrum together with its area weighted counterpart, the latter scaled for purposes of comparison so that the areas under the two curves are identical. Generally, the area-weighted ppsf spectra are qualitatively similar to the unweighted ones, but tend to exaggerate the impact of low tail outliers and yield noisier index time series. We therefore find no compelling reason to use area-weighted ppsf data.

Motivation for the Triple Power Law

We probed extensively for recognizable patterns in the distribution of daily ppsf distributions and found empirical evidence that residential real estate transactions in large metropolitan markets can be described by power laws.

Two scalar quantities x, y are related by a power law if one is proportional to a power of the other: $y=ax^\beta$ where $\beta$ is the exponent and a the proportionality constant.

Such relationships are common in nature (physics and biology), economics, sociology, and generally systems of numerous interacting agents that have the tendency to self-organize to configurations at the edge between order and disorder. Power laws express scale invariance, in simple terms a relationship that holds between the two interrelated variables at small and large scales.

If x, y represent a pair of values of two quantities related via a power law, and x',y' another pair of values of the same two quantities also obeying the same power law, it follows that the two pairs of values are related by:

$$\frac{y}{y'} = \left(\frac{x}{x'}\right)^\beta$$

In logarithmic scale this relationship becomes $$\log y = \log y' + \beta(\log x - \log x') \quad [A]$$

which is a simple line equation relating the logarithms of the quantities in the preceding equation.

When plotted in log-log scale, two scalar quantities x, y related by a power law reveal a straight line over the range of applicability of the power law.

Power laws describe empirically a variety of real-world phenomena, as for example Pareto's Law (the "80/20" distribution of wealth) to name one. Pareto's law represents a somewhat different manifestation of power laws, probing distributions of ranks derived from a cumulative distribution function of a variable. We are interested in the probability density function of the variable itself, here ppsf, resulting in a manifestation of power laws more common in the natural sciences. The two formulations are in principle equivalent and can be recast into each other.

In real estate, power law behavior has been noted in the distribution of land prices in Japan, and of urban real estate prices in Sweden. It is plausible that the often-observed power law distribution of wealth may be reflected in a power-law distribution of housing values.

In the case of home sales, if a ppsf value and its frequency of occurrence (i.e., number of sales per ppsf value) are related by a power law, then that power law can be obtained by replacing x, y in Equation A, respectively by ppsf and N the number of home sales per given ppsf value:

$$\log N = \log N' + \beta(\log ppsf - \log ppsf') \quad [B]$$

Equation [B] states that over an interval, the frequency of transactions is proportional to the ppsf raised to a power. In presenting the ppsf spectra as histograms the height of each bin represents the number of sales corresponding to the ppsf values contained in that bin (here and subsequently for weight 1). It follows that if ppsf and N obey a power law, displaying ppsf histograms in log-log scale ought to reveal spectra which appear as straight lines over the range of applicability of the power law.

The data reveal power law behavior with three distinct power laws in the low, middle and high ends of the price spectrum. The specific price range of each sector and its composition in types of properties varies with geography and over time.

Figure 7:
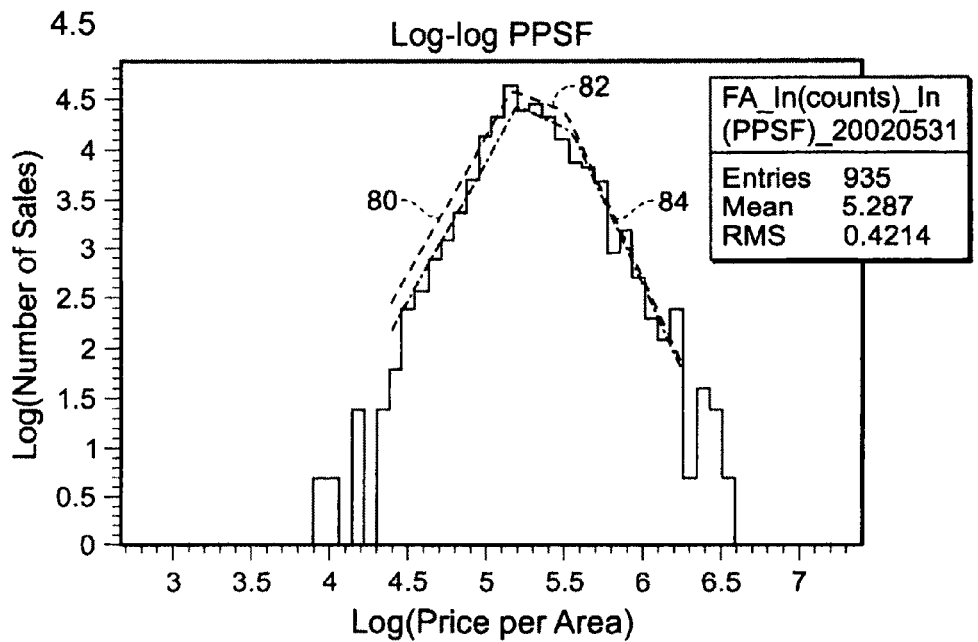

FIG. 7 shows a typical daily ppsf spectrum in log-log scale for a metropolitan area.

The spectrum exhibits three straight-line segmented regions 80, 82, 84 shown by the dashed lines, corresponding to distinct power laws with different exponents $\beta$. The dashed lines show fits that were obtained respectively using the maximum likelihood and least squares methods, discussed later. The binning of the log-log histogram follows a variant of the rules discussed earlier.

This three-component distribution is the TPL. The TPL may be applied to daily sales transactions. The result of this process is to encapsulate an entire distribution of ppsf transactions into a single mathematical distribution from which a reliable and representative single index can be deduced.

Other Possible Formulations

We note that the TPL is a direct and economical formulation in terms of power laws that satisfactorily describes the ppsf data, but the literature on power laws is voluminous and numerous alternative formulations can be concocted. As a non-unique alternative we have tried the Double Pareto Lognormal distribution, which has power law tails and a lognormal central region. Other variants involving power laws in different sub-ranges of the ppsf spectra are possible and could result in parametric indices with overall similar qualitative behavior. As noted earlier, the various mathematical forms in which power laws can be cast in principle constitute equivalent representations and can be transformed into each other.

We have also tried introducing background noise of various forms to the underlying TPL distribution, but found no substantive improvement in the quality of the fits and overall volatility of the time series of the resulting parametric indices.

Non-Parametric Indices

Non parametric indices are simple statistical quantities that do not presume knowledge of the probability density function of the underlying dynamics. Such indices include the mean, the area-weighted mean, the geometric mean, the median, the area-weighted median, the price-weighted mean, and the price-weighted median.

An advantage of non parametric indices over parametric ones is that they require no knowledge or model of the PDF. This makes it straightforward to derive and easy to understand them. By the same token they convey no information on the underlying dynamics of the ppsf price movement.

In discussing FIGS. 5A and 5B, we noted no advantage in using area-weighted ppsf, which eliminates the area-weighted mean and the area weighted median as desirable indices. Likewise, the price-weighted indices were found to be more volatile than their unweighted counterparts. The mean and the geometric mean are sensitive to outliers. A non-parametric index that we found robust to outliers is the median, which generally yields a less noisy time series.

Figures 8A, 8B:
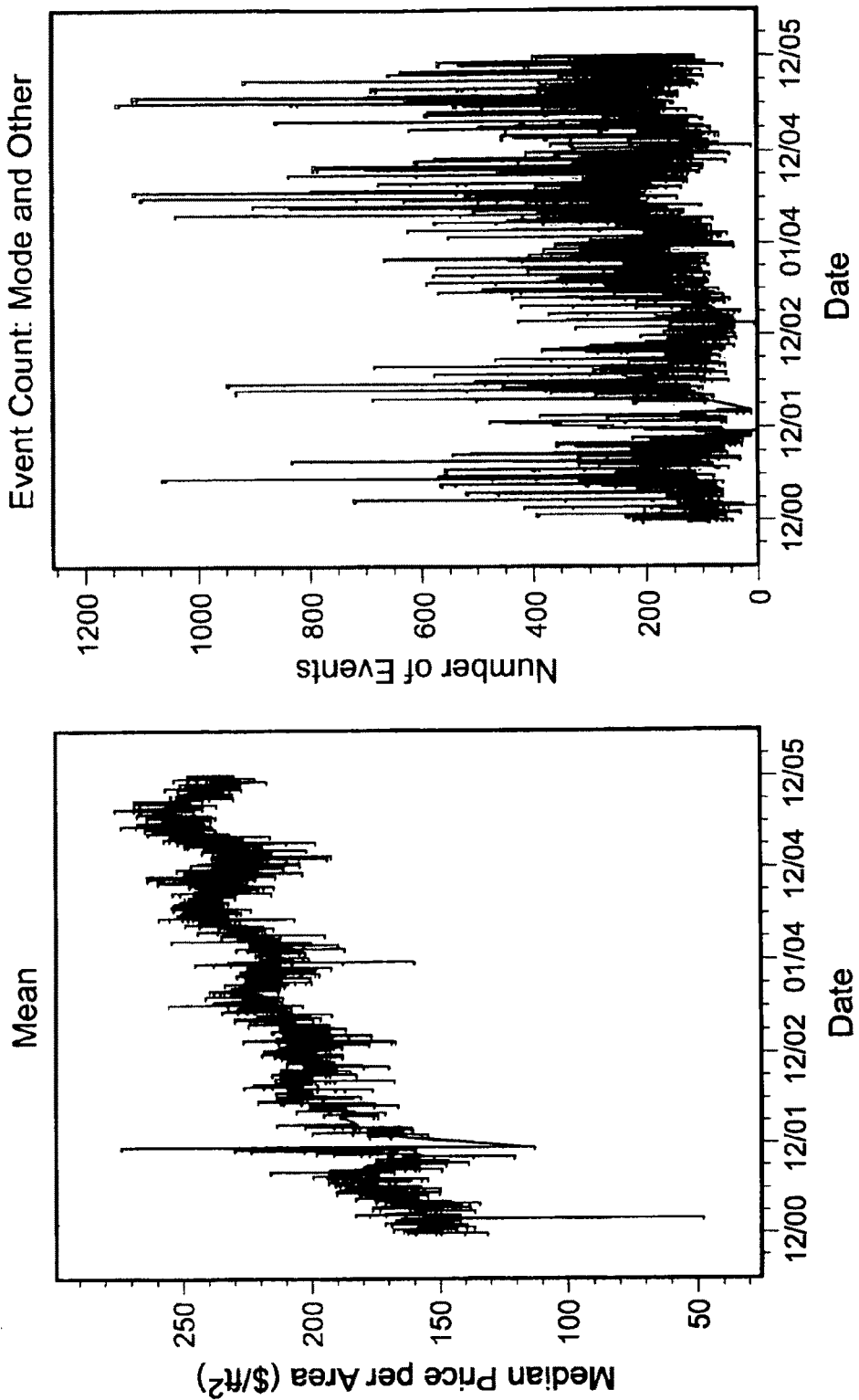
Figure 9B:
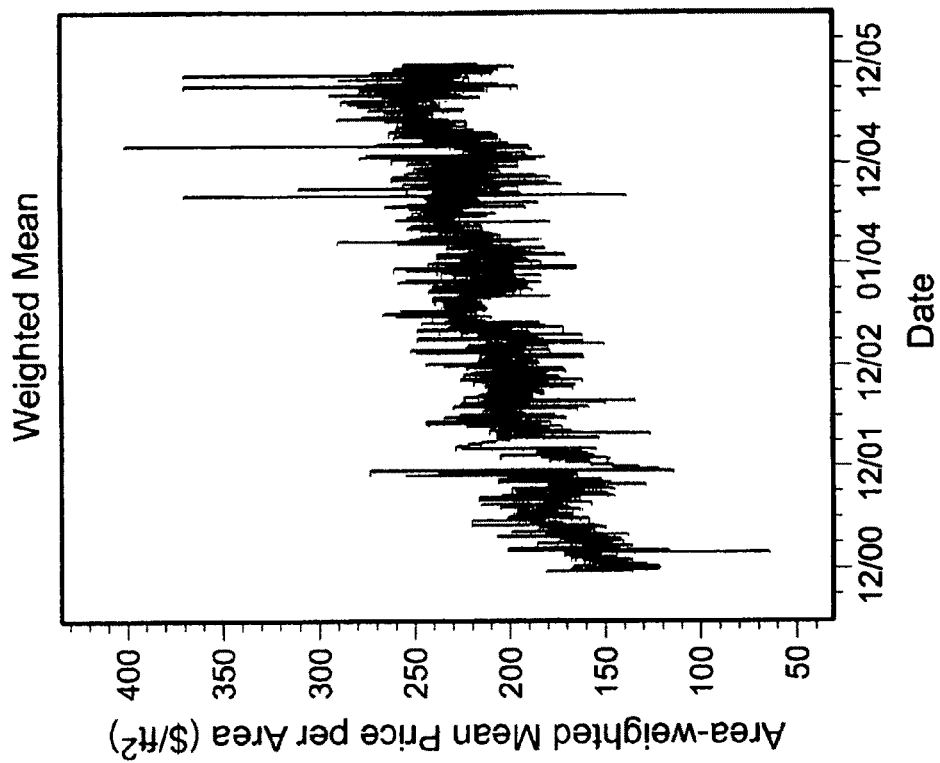
Figure 9A:
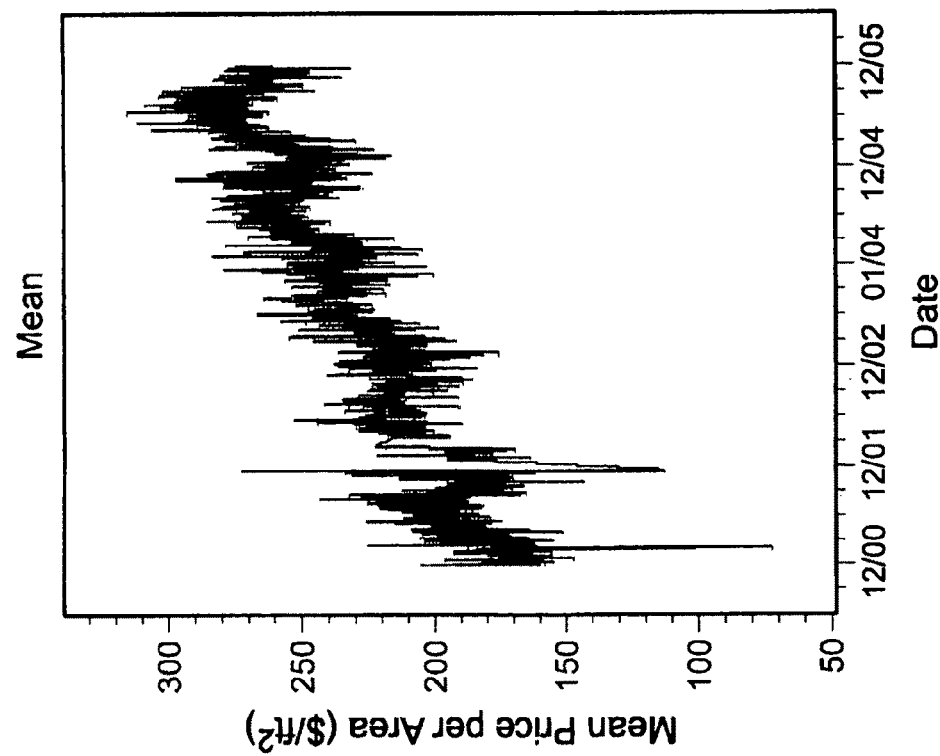
Figure 9D:
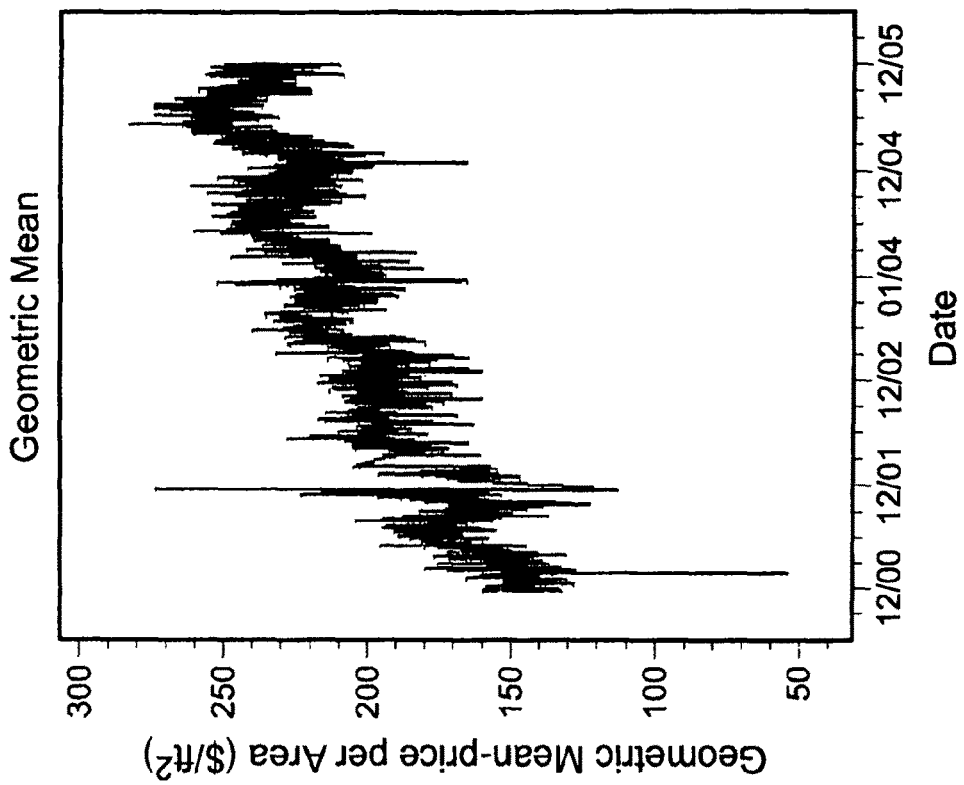
Figure 9C:
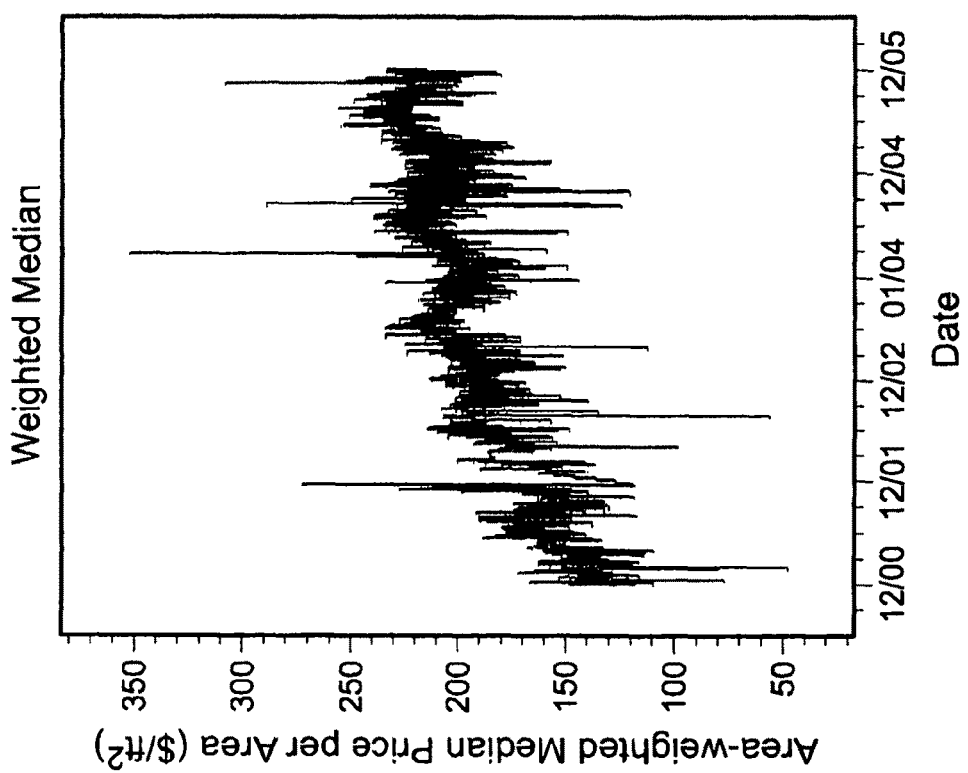

FIGS. 8A and 8B show the median values and daily counts of home sales for a metropolitan area for a five year period. The seasonality (yearly cycles) in the rise and fall of the volume of home sales reflects in the median. A useful index should capture such effects. The median is a robust non-parametric index. Occasional outliers in the median time series (registering as very low or high medians on FIG. 8A) are usually associated with low-volume days without coherent trends (e.g. the first workday following a major holiday).

FIG. 9 shows other non parametric indexes for the same metropolitan area.

The Triple Power Law

Parameterization

Referring to FIG. 10, which illustrates the parameterization of the triple power law displayed in log-log scale, let a be an offset parameter which translates x, the actual ppsf from the data, to x'=x−a. Let d be an upper cutoff defining with a the range a, d of the triple power law (TPL). Let b be the most frequent ppsf, or the mode, associated with the peak height $h_b$ of the spectrum in a given day and place. Let $\beta_L$ be the exponent of a power law of the form of Equation B in the range a≦x<b, implied by the semblance of the left of the spectrum (region L) to a straight line. Likewise, let c be a ppsf value which together with b defines a range b≦x<c over which a second power law holds, $h_c$ the height of the spectrum at c, and $\beta_M$ the exponent of the middle region (region M). Finally let $\beta_R$ be the exponent of a third power law implied in the range c≦x<d on the right (region R).

As shown in FIG. 11, our goal is to derive a distribution function 90 consistent with TPL per dataset of home sales in a given date and location. To do so we write down expressions for each of regions L, M and R.

$$f(x) = \begin{cases} h_b\left(\frac{x-a}{b-a}\right)^{\beta_L}; & a \leq x \leq b \\ h_c\left(\frac{x-a}{c-a}\right)^{\beta_M}; & b \leq x < c \\ h_c\left(\frac{x-a}{c-a}\right)^{\beta_R} & c \leq x \leq d \end{cases} \quad [C]$$

The function $f(x)$ of the above equation involves three power laws each over the specified range. We need to specify all of the parameters in this equation.

Cutoffs

Statistical ways of determining 92 the outer limits a, d of the TPL range applied on ppsf histograms include the following procedure.

A suitable histogram representation of a ppsf dataset would have an average bin count $\sqrt{N'}$ where N' is the number of data points to within three standard deviations from the mean as discussed earlier. The Poisson noise of the average bin count, named for convenience bin count threshold (bct), is then $$bct = N'^{1/4}$$

Let $i_{max}$ be the label of the bin in the log-log histogram with the highest number of counts; this is not necessarily the mode, but a landmark inside the ppsf range over which TPL is expected to hold.

Search to the left of bin $i_{max}$ for the first occurrence of a bin $i_l$ with count content $N_l$<bct Search to the right of bin $i_{max}$ for the first occurrence of a bin $i_r$ with count content $N_r$<bct Define as a the ppsf value of the left edge of bin i, and as d that of the right edge of bin $i_r$.

For the rationale for this procedure, recall that the quantity $\sqrt{N'}$ represents simultaneously the approximate number of bins and average bin content within three standard deviations from the mean ppsf. For Poisson statistics bct represents the noise in the average bin count. In so far as ppsf obeys a power law, its frequency falls rapidly in moving outwards from the neighborhood of the mode toward lower or higher values. Hence once the distribution falls below bct in either direction it is unlikely for it to recover in so far as the dynamics observe a power law. To the extent that bct is the noise level of an average bin, bins with count below that level are statistically insignificant. In so far as statistically significant bins exist in a spectrum beyond the first occurrence of a low-count bin in either outward direction from the neighborhood of the mode, these cannot be the result of power-law dynamics and must be attributed to anomalies. In the examples of FIGS. 7, 8A, and 8B, the edges a,d of the TPL range coincide with those of the fitted curves (dashed lines). Cuts so obtained are effective in eliminating outliers. The above algorithm generally does a good job of restricting the range of data for stable TPL fits.

A simpler scheme for fixing the lower and upper cutoffs (i.e., range of ppsf values in a dataset retained for the derivation of the index) is the following:

We let a be a fit parameter, namely one that is fixed by the fit.

We fix the upper ppsf cutoff to $$d = x_{max} + 0.1\$/ft^2$$

i.e., the maximum ppsf value encountered in the dataset of interest plus 0.1 dollar per square foot fixes parameter d.

We fix the lower ppsf cutoff to $$\text{lower cutoff} = x_{min} - 0.1\$/ft^2$$

If lower cutoff<a then we override the value of a from the fit and use a=lower cutoff.

Analysis of data suggests that parameter a and the left cutoff have a marginal impact on the quality of the fits and computation of parametric indices and can be omitted.

Constraints

Rather than try to obtain all of the remaining parameters by fitting to the data, we use all the known relationships as constraints 94 to fix some of these parameters. This is mathematically sensible as analytical solutions are preferable to fits. To the extent that some of the parameters can be fixed analytically the number of parameters remaining to be obtained from fitting is reduced. This is desirable as it facilitates the convergence of the fitting algorithm to the optimum and generally reduces the uncertainty in the values returned from the fit.

For convenience let us first fix the height at b to $$h_b = 1$$

so that in effect we have transformed the problem of finding the optimum value of $h_d$ to that of finding an optimum overall scale parameter s of the spectrum.

We then note that evaluating the middle region at x=b yields $\beta_M$ as $$h_c\left(\frac{b-a}{c-a}\right)^{\beta_M} = h_b \Rightarrow \beta_M = \frac{\ln h_c - \ln h_b}{\ln(c-a) - \ln(b-a)}$$

Hence we obtain $\beta_M$ from the above constraint. There remain to be determined in total seven parameters: a, b, c, $h_c$, $\beta_{L,R}$ and the scale s.

To constrain the fitting algorithm into searching over admissible domains of the parameters we note that we must have $a \leq b$ and $b \leq c$. Hence, instead of searching over parameters a, c we substitute
$a = p_L b$; $0 < p_L \leq 1$
$c = p_R b$; $1 < p_R$
and search over $p_{L,R}$ in the ranges indicated above. Having applied the constraints and substitutions discussed earlier, we end up with the TPL distribution in the form $$f(x') = s \begin{cases} \left(\frac{x'}{1-p_L}\right)^{\beta_L}; & 0 < x' \leq 1 - p_L \\ h_c\left(\frac{x'}{p_R - p_L}\right)^{\beta_M}; & 1 - p_L < x' < p_R - p_L \\ h_c\left(\frac{x'}{p_R - p_L}\right)^{\beta_R}; & p_R - p_L \leq x' \leq d/b - p_L \end{cases} \quad [D]$$

where $$x' = \frac{x}{b} - p_L$$

We therefore need to obtain values for the parameters b, $p_{L,R}$, $h_c$, $\beta_{L,R}$, s We do this by applying fitting algorithms 96.

The Least Squares Method

Initially we obtained the remaining parameters using the least squares method, applied on histograms generated using the methods discussed earlier. The least squares method is a common fitting algorithm that is simple and extensively covered in the literature. In fitting histograms with the least squares method, one does not use the ppsf of individual sales but rather the value corresponding to the midpoint of a bin, and as frequency the corresponding content of that bin. In an improved variant one fits integrals over bins instead of the value at the midpoint. Hence the number of fit points is the number of bins in the histogram rather than the actual number of the data points. In using the least squares method the scale parameter s of the parameterization is obtained by setting the integral of the function equal to the total count or integral of the ppsf histogram, i.e. s is a parameter fixed by an empirical constraint.

The least squares method is an easy to implement but relatively crude way of fitting for the parameters. Its disadvantages are in principle that (a) it effectively reduces the number of data points to that of the number of bins thus degrading the resolution of the fit resulting in more uncertainty or noise, (b) it depends explicitly on the choice of the histogram bin size, and (c) that low volume days may result in poor resolution histograms with a number of bins inferior to that of the free parameters and therefore insufficient for constraining the parameters and yielding meaningful values in a fit.

In practice we found that (b) and (c) were not issues. The methods discussed above for determining a suitable bin size produced clean spectra and statistical cuts for eliminating outliers that worked as intended. The number of bins in the ppsf histograms sufficed to constrain the parameters in the fits even for the days with the lowest transaction volume in the historical data we considered. However (a) was an issue, as least squares fits of histograms generally yield values for the parameterization associated with large uncertainties, resulting in volatile index time series.

We note that other similar methods exist, by which one can fit the parameterization.

The Maximum Likelihood Method

Another perhaps better method which entails the maximization of a likelihood function is the maximum likelihood method, a common fitting algorithm used extensively in the literature, but somewhat more involved than the least squares method in that one has to construct the likelihood function explicitly for a given theoretical expression. This method requires a theoretical PDF. The normalization condition for a PDF $f(x)$ is $$I \equiv \int_a^b dx f(x) = 1$$

with $f(x)$ from above.

To get I we calculate the three integrals over Regions L, M and R of FIG. 7:

$$I_L = s I'_L; \quad I'_L = b\frac{1 - p_L}{\beta_L + 1}; \quad \text{Region L}$$

$$I_M = s I'_M; \quad I'_M = b h_c \frac{(p_R - p_L)^{\beta_M + 1} - (1 - p_L)^{\beta_M + 1}}{(\beta_M + 1)(p_R - p_L)^{\beta_M}}; \quad \text{Region M}$$

$$I_R = s I'_R; \quad I'_R = b h_c \frac{(d/b - p_L)^{\beta_R + 1} - (p_R - p_L)^{\beta_R + 1}}{(\beta_R + 1)(p_R - p_L)^{\beta_R}} \quad \text{Region R}$$

$$I = s(I'_L + I'_M + I'_R)$$

where $I_{L,M,R}'$ are the unnormalized integrals of the TPL (without the overall scale factor s) over the three respective regions L, M, R.

The normalization condition I=1 is achieved by fixing the scale parameter to $$s = 1/(I_L' + I_M' + I_R')$$

which yields a proper PDF for the ppsf spectra consistent with TPL. While for the least squares method s was fixed by an empirical constraint, here it is fixed by a theoretical one, namely that the PDF integrate to unity. This makes the likelihood method more sensitive to whether or not the theoretical expression for the distribution function represents accurately the system of interest. By the same token, if a theoretical PDF yields high quality fits with the likelihood method, one can have higher confidence that it truly captures the underlying statistics of the genuine system.

To fix the remaining parameters we build the log likelihood function by taking the sum of the natural logarithms of the PDF evaluated at each ppsf value in a given dataset. The log likelihood function becomes:

$$LL = \sum_{i=1}^{N} \ln f(x_i)$$

left cutoff $\leq x_i \leq d$ where $x_i$ are the actual ppsf values in the specified range of sales i in a given dataset.

Fitting for the remaining parameters entails maximizing LL, which can be achieved by using standard minimization or maximization algorithms such as Powell's method, gradient variants, the simplex method, Monte-Carlo methods etc.

Fitting (or optimization) algorithms are, for example, non-linear searches over a parameter space of a parameterization aimed at finding values that maximize the overlap between the actual behavior of a set of empirical data and its representation as encapsulated in the theoretical model of the parameterization. A fitting algorithm comprises the methodical variation of the parameter values, the determination at each step whether improvement has been achieved, and a termination criterion for deciding that maximum convergence has been attained between the model and the actual data.

Fitting Procedure

Fitting multi-parameter functions can present many challenges, especially for datasets characterized by poor statistics, and may require correction procedures 98. Many metropolitan areas are plagued by systematic low transaction volumes. If one fits all six remaining parameters to daily data then the resulting values have large uncertainties associated with them which are reflected in any parametric index derived from the PDF, registering as jittery time series with large daily fluctuations. Such fluctuations represent noise rather than interesting price movement due to the underlying dynamics of the housing market and to the extent they are present degrade the quality and usefulness of the index. To reduce the fluctuations one could increase the volume of the dataset that is being analyzed, e.g. by using datasets aggregated over several days instead of just one day per metropolitan area but doing so would diminish the appeal and marketability of a daily index.

Alternatively, one can attempt to fix some of the parameters using larger time windows if there is evidence that these parameters are relatively slowly varying over time and fix only the most volatile parameters using daily data. Analysis of actual data suggests that the majority of the parameters are slowly varying and can be fixed in fits using larger time windows. The following fitting procedure works well:

For each metropolitan area of interest, for each date for which we wish to calculate the parameters of the PDF, we consider the preceding 365 days including the current date.

We implement a two-step fitting algorithm in which:

The parameters $p_{L,R}$, $\beta_{L,R}$, $h_c$ are varied simultaneously for all the regular workdays amongst the 365 calendar days leading up to and including the current date, and optimized in an outer call to the fitting algorithm which maximizes $$\sum_{i=current\ date}^{current\ date-365} \begin{cases} LL_i; & i \text{ is workday} \\ 0; & \text{otherwise.} \end{cases}$$

The parameter b (the mode) is optimized individually for each of the 365 days by maximizing each individual $LL_i$ independently in 365 inner calls to the fitting algorithm.

The optimized values $p_{L,R}$, $\beta_{L,R}$, $h_c$ and $b_{current\ date}$ so obtained are retained and attributed to the current date; all the remaining b, also obtained for the 364 preceding days are discarded. Another possibility would be to use all the $b_i$'s and report a weighted average $\overline{b}_i$ from 365 independent computations for each day.

This procedure is iterated for each date of interest.

Specifically, a fitting algorithm that implements the above example is set forth below:

1. For a metropolitan statistical area (MSA) and time interval of interest, a loop is entered over all the workdays for which the index is to be computed.
2. For each workday, the slowly varying parameters $p_{L,R}$, $\beta_{L,R}$, $h_c$ are simultaneously varied and fixed for all the intermediate workdays in the calendar year leading up to the current workday.
3. For each set of slowly varying parameters, a loop is entered over the intermediate workdays of the preceding calendar year up to the current date. For each intermediate workday the volatile parameter b is varied separately and the likelihood function for that day is computed. A likelihood function is a standard statistical construct which, used in conjunction with a model PDF of a variable it purports to be describing, conveys how likely it is for a given empirical spectrum of that variable to have been generated by the model PDF. A likelihood function comprises a product of terms, each of which is the value of the model PDF evaluated at each point in the dataset. For TPL the underlying variable is ppsf. We use a variant, the log likelihood function, which comprises the sum of logarithms of terms as described above instead of their product. This avoids numerical instabilities and facilitates more reliable fits.
4. The search for an optimum parameter b, given a set of shape parameters, eventually converges for each intermediate workday. When this happens the fitting algorithm returns the value for parameter b that maximizes that day's log likelihood function, together with the value of the latter.
5. Once step (4) has been completed for each intermediate workday, the cumulative log likelihood function for all the intermediate workdays of the preceding year up to the current day is computed as the sum of the respective maximized log likelihood values of all the intermediate workdays. The fitting algorithm then determines whether further maximization of the cumulative log likelihood function is possible, in which case it iterates steps (2-5); otherwise the shape parameter search is terminated.
6. On terminating, a set of values has been obtained that renders an initially abstract TPL parameterization into an empirical PDF that describes accurately the data for the current workday. The index for the current workday is derived from this PDF.
7. Steps (1-6) are iterated for all the workdays and MSA's of interest.

The outcome of this is optimized values for all the parameters of the PDF per date and metropolitan area.

Maximum Likelihood with Measurement Errors

The maximum likelihood method can be extended to explicitly allow for errors in the data. The errors may arise from typographical mistakes in entering the data (either at the level of the Registry of Deeds or subsequently, when the data are transcribed into databases). The model is then $$z_i = x_i + \epsilon_i$$

where $z_i$ is the actual price per square foot of the $i^{th}$ transaction in a dataset on a given day, $x_i$ is the hypothesized true price per square foot and $\epsilon_i$ is the error in recording or transmitting $z_i$. The error $\epsilon_i$ is modeled as a random draw from a probability density function such as a uniform distribution over an interval, a Gaussian with stated mean and standard deviation, or other suitable form. The procedures for maximizing the likelihood of the parameters of the TPL and for constructing an index are as in the preceding sections, except (1) the list of parameters to be estimated by the maximum-likelihood method is extended to include the parameters of the PDF characterizing $\epsilon_i$ (for example, the standard deviation of $\epsilon_i$ if it is taken to be a zero-mean Gaussian with constant standard deviation), and (2) in the calculation of the likelihood of any given set of parameters, the computation proceeds as before, but an extra step must be appended, which convolves the TPL PDF with the PDF describing $\epsilon_i$. This convolution must be done numerically, either directly or via Fast Fourier Transforms (FFT).

Maximum Likelihood with Dynamic Filtering

The accuracy of the index can be extended by taking into account the dynamics of the real estate market. Specifically, for residential real estate the registration of the agreed price takes place one or more days after the resolution of supply and demand takes place. The index seeks to reflect the market on a given day, given the imperfect data from a subset of the market. By including the lag dynamics between price-setting and deed registration, the index can take into account that the transactions registered on a given day potentially reflect the market conditions for a variety of days preceding the registration. Therefore, some of the variation in price on a given day is from the variety of properties transacted, but some of the variation may be from a movement in the supply/demand balance over the days leading up to the entering of the data.

For example, if two equal prices (per square foot) are registered today, and if the market has been in a sharp upswing during the prior several weeks, one of the prices may be a property whose price was negotiated weeks ago. The other similar price may be from a lesser property whose price was negotiated only a few days earlier. The practical consequence of this overlapping of different market conditions in one day's transactions is that the observed day-to-day movement of prices has some built-in inertia. Therefore, we may extend the mathematical models above to include this inertia and get an even more accurate index of market conditions.

To work backwards from the observed closing prices to the preceding negotiated prices, taking into account the intervening stochastic delay process, we use the computational techniques of maximum likelihood estimation of signals using optimal dynamic filtering, as described by Schweppe.

Parametric Indices

The TPL PDF of the previous section is not in itself an index but rather the means of deriving parametric indices 99. Among others, the following parametric indices can be derived.

The Mode

When the exponents $\beta_{L,M,R}$ are obtained from fits using data aggregated over multiple day windows (which is a good procedure) then the most frequent value, or mode, is parameter b of the TPL PDF (i.e. $\beta_M$ so obtained is invariably negative and $h_b > h_c$). If however all the parameters are obtained from fitting single day spectra then the volatility is higher and occasionally c turns out to be the mode (i.e. sometimes $h_b < h_c$ so that the exponent $\beta_M$ is positive). Hence one should use as the mode for day i:

if $\begin{pmatrix} b_i \text{ from 1-day spectra, all the other} \\ \text{parameters from multi-day spectra} \end{pmatrix}$ then $Mode_i = b_i$;

else $\begin{cases} \text{if } (h_{b_i} \geq h_{c_i}) \ Mode_i = b_i; \\ \text{else } Mode_i = c_i; \end{cases}$ Using exclusively the second "if . . . then . . . " statement is safest and will work in both cases.

The Mean

Although the non-parametric mean was derived from the data, its parametric counterpart here is derived from the TPL PDF. From first principles, if $f(x)$ is the PDF (i.e. normalized to 1), the mean of variable x is:

$$\bar{x} = a + \int_a^d dx (x-a) f(x)$$

Calculating the integral on the right-hand side over regions L, M and R, yields:

$$I'_L = \frac{sb^2}{\beta_L + 2}(1 - p_L)^2 \quad \text{Region L}$$

$$I'_M = h_c \frac{sb^2}{\beta_M + 2} \frac{(p_R - p_L)^{\beta_M+2} - (1 - p_L)^{\beta_M+2}}{(p_R - p_L)^{\beta_M}} \quad \text{Region M}$$

$$I'_R = h_c \frac{sb^2}{\beta_R + 2} \frac{(d/b - p_L)^{\beta_R+2} - (p_R - p_L)^{\beta_R+2}}{(p_R - p_L)^{\beta_R}} \quad \text{Region R}$$

so that (with the parameter substitutions as above, which normalize the PDF to unity) the parametric mean becomes $$\bar{x}_{TPL} = I'_L + I'_M + I'_R + bp_L$$

The Median

For the PDF $f(x)$, normalized to unity with the substitutions of the above sections, the median $\bar{x}$ can be derived from the condition:

$$\int_a^{\bar{x}} dx f(x) = \frac{1}{2}$$

Depending on the values of the integrals $I_{L,M,R}$, we get:

if $(I_L > 0.5)\bar{x}_{TPL} = b \left\{ \left[ \frac{1}{2sb}(1 - p_L)^{\beta_L}(\beta_L + 1) \right]^{\frac{1}{\beta_L+1}} + p_L \right\}$ else if $(I_L + I_M > 0.5)\bar{x}_{TPL} =$ $b \left\{ \left[ \frac{1}{sbh_c}\left(\frac{1}{2} - I_L\right)(p_R - p_L)^{\beta_M}(\beta_M + 1) + (1 - p_L)^{\beta_M+1} \right]^{\frac{1}{\beta_M+1}} + p_L \right\}$ else $\bar{x}_{TPL} =$ $b \left\{ \left[ \frac{1}{sbh_c}\left(\frac{1}{2} - I_L - I_M\right)(p_R - p_L)^{\beta_R}(\beta_R + 1) + (p_R - p_L)^{\beta_R+1} \right]^{\frac{1}{\beta_R+1}} + p_L \right\}$ The Nominal House Price Mean This is a non-standard mean over the middle range of TPL (Region M), which represents the mainline of the housing market (regions L and R represent respectively the low and high end). From $I_M', I_M$ we get:

$$\bar{x}_M = \frac{I_M'}{I_M}.$$

The Nominal House Price Median

This is a non-standard median over (region M):

$$\tilde{x}_M = \frac{b}{I_M} \left\{ \left[ \frac{1}{2sbh_c}(p_R - p_L)^{\beta_M}(\beta_M + 1) + (1 - p_L)^{\beta_M + 1} \right]^{\frac{1}{\beta_M + 1}} + p_L \right\}.$$

Pdf and Log-Log Scale Histograms

Displaying ppsf spectra as log-log scale histograms with fixed bin size introduces a distortion which must be accounted for in the PDF representation if it is to be superposed on the histogram for comparisons. The log-log scale distortion affects the exponents $\beta_{L,M,R}$ of the TPL PDF. Below we start off with the histogram representation in log-log scale and arrive at the modification the log-log scale induces to the exponents.

Let $\delta l$ be the fixed bin size (obtained with a variant of the arguments previously discussed, adapted for log scale) in units of ln x, the natural logarithm of x, used for convenience in place of ppsf. Starting with the histogram representation, for the $i^{th}$ bin in log scale we have:

$$\delta l = \ln x_i - \ln x_{i-1} \Rightarrow \frac{x_i}{x_{i-1}} = e^{\delta l}$$

where $x_{i-1,i}$ are respectively the start and endpoints of the corresponding bin in linear scale.

The width of the $i^{th}$ bin in linear scale is $$w_i = x_i - x_{i-1} = e^{i\delta l} - e^{(i-1)\delta l} = e^{(i-1)\delta l}(e^{\delta l} - 1)$$

which unlike $\delta l$ is no longer fixed but grows exponentially with i−1. The content $N_i$ of the $i^{th}$ bin grows as a result of the fixed bin size in log scale in proportion to $w_i$ $$N_i \propto e^{(i-1)\delta l}(e^{\delta l} - 1)$$

The relationship between the counts $N_{i,j}$ of two bins due to this effect can be expressed as $$\frac{N_i}{N_j} = e^{(i-j)\delta l} \Rightarrow \ln N_i = \ln N_j + (i - j)\delta l = \ln N_j + (\ln x_i - \ln x_j)$$

where $x_{i,j}$ are the endpoints of the corresponding bins, ln $x_i = i\delta l$ and likewise for j.

If in addition a power law applies, then the log distortion effect is additive in log scale so that the overall relationship between bins i,j becomes $$\ln N_i = \ln N_j + (\beta + 1)(\ln x_i - \ln x_j)$$

Hence in fitting the undistorted power law using the PDF representation one obtains the true exponent $\beta_{PDF}$, whereas using the histogram representation one obtains $$\beta_H = \beta_{PDF} + 1$$

due to the log scale distortion effect.

In superposing fitted curves from the likelihood method onto histograms in log-log scale with fixed size ln(ppsf) bins one must therefore amend the fitted curve taking the above into account.

Current Implementation of the Index

The above description of the parameterization, fitting procedure, and possible parametric indices illustrates a general TPL formulation of the probability density function that describes residential real estate ppsf spectra. Here we present a specific manifestation of this approach in an index.

We noted earlier that the cutoffs have a marginal effect. Here we remove the cutoffs, which has two advantages. First, it reduces the number of parameters, simplifying the mathematics and yielding higher confidence fits. Second, it results in a more transparent physical interpretation of the slowly varying parameters as those determining the shape of the distribution, and the single more volatile parameter as the one that fixes the position of the distribution.

Below we present the simplified parameterization, discuss the physical meaning of the shape and position parameters, and derive the median from this simplified TPL form.

Referring again to FIG. 10, we now remove the offset parameter a. The initial motivation for introducing a was to capture possible shifts in the spectra over time and across geography. In practice, however, the optimal value for this parameter was typically determined by the fits to be zero for the historical data we considered, which indicates that it is, at least in some cases, unnecessary and as such burdens the fitting algorithm by augmenting the dimensionality of the search space by one parameter, and to this extent degrading the quality of the fit. In fact the daily datasets include a minimum and a maximum ppsf value, denoted earlier as $x_{min}$, $x_{max}$ respectively, which suffice to bound the range of ppsf to be considered by the fitting algorithm without the need for additional parameters to be determined by the fit. Earlier we set the upper cutoff d to the value $x_{max}$ augmented by 0.1\$/ft$^2$. While it is a good practice to slightly augment the upper limit for the search from the actual maximum ppsf value of the dataset, in order to ensure that roundoff computational errors are not a factor, here for simplicity we will make this augmentation implicit and refer to the upper cutoff as simply $x_{max}$. Likewise, although for computational purposes we may choose to slightly lower the value of the lower cutoff, e.g. by −0.1\$/ft$^2$, here for simplicity we make any such lowering implicit. Thus, having disposed of the cutoff parameter a, we use as lower cutoff the lowest value of the actual dataset $x_{min}$. In summary, we have eliminated parameters a,d of our earlier more general parameterization, and now proceed to derive equations analogous to those described earlier with parameters suppressed.

Specifically, eliminating a,d and using the empirical cutoffs $x_{min}, x_{max}$, the ranges of the regions L, M, R of FIG. 10 become respectively $(x_{min},b)$, $(b,c)$, $(c,x_{max})$. These cutoffs ensure that no data are excluded from the computation, while also restraining the search algorithm from straying to ranges of values it does not need to consider, where there is no data. As earlier, $\beta_{L,M,R}$ denote the exponents of the power laws over the three regions and $h_{b,c}$ denotes the natural logarithms of the frequency respectively at b, c. In log-log scale the exponents of power laws appear as slopes of line segments and, as explained herein, an artifact of using fixed size bins in logarithmic scale is for these slopes in the histogram of FIG. 10 to appear exaggerated by 1 relative to the true exponents of the power laws. This artifact affects illustrations of TPL superposed on histograms and does not affect the actual derivation of the index as described.

The above simplifications lead to the form of TPL below, in analogy to Equation [C]:

$$f(x) = \begin{cases} h_b\left(\frac{x}{b}\right)^{\beta_L}; & x_{min} \leq x \leq b \\ h_c\left(\frac{x}{c}\right)^{\beta_M}; & b < x \leq c \\ h_c\left(\frac{x}{c}\right)^{\beta_R}; & c < x \leq x_{max} \end{cases} \quad [E]$$

The parameterization [E] matches the two power laws in the middle and right regions at their interface c. This constraint is necessary for physical behavior, since there can be no discontinuities in the distribution as ppsf approaches the boundary between two adjacent regions from the left or from the right. We need however to also enforce this physical requirement at the interface b between the left and middle regions. To do so we evaluate the power law equation for the middle region at b, and require that its value there matches $h_b$, which is the value of the power law on the left at that point. As a result of imposing this constraint, the slope of the power law in the middle region becomes fixed:

$$h_c\left(\frac{b}{c}\right)^{\beta_M} = h_b \Rightarrow \beta_M = \frac{\ln h_c - \ln h_b}{\ln c - \ln b}$$

Hence, as a consequence of imposing a physical constraint on Equation [E] we have also reduced by one the number of parameters remaining to be fixed by the fit.

We next note that the function $f(x)$ of Equation [E] is normalized to unity in order for it to be a valid PDF. To illustrate what this requirement means, we paraphrase it as an equivalent statement: if one picks at random the ppsf value of a transaction in a daily dataset, that value is certain (i.e. has probability 1) to lie between $x_{min}$ and $x_{max}$, the actual maximum and minimum values of that dataset. Although this statement is self evident, it has to be imposed mathematically on the TPL parameterization. As written in Equation [E], TPL exhibits a desired power law behavior which qualitatively matches that of the empirical ppsf spectra, but it is not yet properly normalized. Formally, this is achieved by forcing the integral of the PDF over its entire range to be unity:

$$I \equiv \int_{x_{min}}^{x_{max}} dx f(x) = 1$$

Before proceeding to the evaluation of this integral we make a couple of convenient parameter substitutions. Since we have not yet normalized $f(x)$ of Equation [E], its absolute scale is arbitrary up to an overall multiplicative constant. We take advantage of this and let for convenience $$h_b = 1$$

introducing at the same time an overall scale parameter s which multiplies $f(x)$.

For reasons that will become evident shortly, we would also like to eliminate the explicit dependence of $\beta_M$ on b in the denominator of the expression derived from matching the power laws at the boundary b above. To do so we introduce an auxiliary parameter p by means of which we express c as a multiple of b, noting that because of our definition of the three regions we must have $b \leq c$. We can then recast c as follows:

$$c = pb; \quad 1 < p$$

In effect, what we have done is to replace the search over parameter c by a search over parameter p given a value for b, with the constraint that only values greater than 1 are permissible.

With the above substitutions the expression that fixes $\beta_M$ reduces to:

$$\beta_M = \frac{\ln h_c}{\ln p}$$

Returning to the integral I of the full distribution, we note that it is the sum of three integrals over the respective components of Regions L, M and R of FIG. 10:

$$I_L = sI'_L; \quad I'_L = \frac{b}{\beta_L + 1}\left[1 - \left(\frac{x_{min}}{b}\right)^{\beta_L + 1}\right]$$

$$I_M = sI'_M; \quad I'_M = \frac{bph_c}{\beta_M + 1}\left[1 - \frac{1}{p^{\beta_M + 1}}\right]$$

$$I_R = sI'_R; \quad I'_R = \frac{bph_c}{\beta_R + 1}\left[\left(\frac{x_{max}}{bp}\right)^{\beta_R + 1} - 1\right]$$

$$I = s(I'_L + I'_M + I'_R)$$

Since s is an overall constant which multiplies all three integrals above, the normalization condition I=1 can be achieved easily by setting:

$$s = 1/(I_L' + I_M' + I_R')$$

This fixes the scale s and turns $f(x)$ into a proper PDF consistent with TPL.

We recap all of the above by recasting the TPL parameterization as $$f(x) = s\begin{cases} x'^{\beta_L}; & x'_{min} < x' \leq 1 \\ h_c\left(\frac{x'}{p}\right)^{\beta_M}; & 1 < x' < p \\ h_c\left(\frac{x'}{p}\right)^{\beta_R}; & p \leq x' \leq x'_{max} \end{cases} \quad [F]$$

which is analogous to Equation [D] of the more general parameterization, where $$x' = x/b, \quad x_{min}' = x_{min}/b, \quad x_{max}' = x_{max}/b$$

The motivation for the introduction of the parameter p for the search in place of c was to enable disentangling the shape from the position of the TPL distribution in logarithmic scale, achieved in Equation [F] and the subsequent equation above.

The parameters p, $h_c$, $\beta_{L,R}$ capture the shape of the ppsf distribution and the single parameter b its position, which we have determined from our analysis of historical data to have different characteristic timescales: specifically the shape conveys the distribution of relative quality of the housing stock in a given market, which is often stable in the short term changing slowly over time in a manner that reflects longer-term socioeconomic and cultural trends; the position on the other hand reveals the correspondence between quality and value in the local market on a given day, as determined by that day's actual sales, and is susceptible to short-term shifts in the economy, changes in market sentiment, and news shocks, and can be volatile even as the underlying housing stock remains unaltered.

With the elimination of the offset parameter a, the resulting simplified parameterization conveniently separates out the shape from the position dependence of the distribution so as to allow accounting for their respective timescales. This separation has several benefits.

First, in our parameterization the parameters that capture the overall shape of a market's ppsf distribution are the most numerous. Since the shape is generally stable in the short term and the parameters that describe it have been disentangled from the more volatile position, their computation can use data collected over a longer time period. The resulting higher volume of sales transactions improves the quality of the fit and the statistical confidence in the TPL shape as an accurate snapshot of how quality is distributed in the local housing stock. Second, some geographical areas exhibit periodicity in transaction volume and ppsf (e.g. Boston houses sell more slowly and for less in the winter). Being able to use data over a longer time period for the shape parameters allows incorporating a full annual cycle, ensuring that seasonal effects do not introduce artificial distortions in the derived shape. Therefore we have chosen to use a year's worth of data as the relevant timescale for computing the shape parameters—more precisely the workdays among the three hundred sixty five calendar days up to the date for which the index is computed, a distinction which stresses that there is no aggregation but the data are kept separate for each workday.

The third benefit from formulating TPL so as to disentangle the shape from the position dependence is that the latter is reduced to a single parameter. This is important since the daily transaction volume can be so low as to potentially induce a multi-parameter fit that depends exclusively on it to yield low-confidence values. Capturing the volatility of the market's movement in a single parameter essentially enables a daily index, ensuring that a day's transaction volume even if low is adequate to fix the position of the ppsf spectrum to within statistical uncertainty compatible with the actual data.

In the more general parameterization which included the offset parameter a the parameter b also affected the shape, so that the separation into shape and position parameters was not complete. Nonetheless, even in the general parameterization that separation was approximate, namely b could potentially affect the shape for large values of a which in practice were never realized.

Equipped with the TPL form which achieves the separation of the shape from the position of the underlying distribution, we proceed to deriving the median from this form which we denote as $\bar{x}$. The TPL-derived median $\bar{x}$ is a robust possible index that can be obtained from daily empirical sets of ppsf data in residential real estate transactions.

By definition, if $\bar{x}$ represents the median ppsf of a dataset of home sale transactions, picking a random transaction in that dataset has a 50-50% probability to be higher or lower respectively of the median. Formally, this translates into the mathematical statement that the integral of the PDF up to the median yields the value ½:

$$\int_{x_{min}}^{\bar{x}} dx f(x) = \frac{1}{2}$$

The evaluation of the integral above depends on how the ppsf values in the distribution are split among the three regions L, M and R, or equivalently the values of the integrals $I_{L,M,R}$ for which expressions were derived earlier using the simplified form of TPL. Specifically, depending on $I_{L,M,R}$, $\bar{x}$ evaluates to the following:

$$\bar{x} = b \times \begin{cases} \left[\frac{1}{2}\frac{\beta_L+1}{sb} + x_{min}'^{\beta_L+1}\right]^{\frac{1}{\beta_L+1}}; & I_L > 0.5 \\ \left[\left(\frac{1}{2}-I_L\right)\frac{\beta_M+1}{sb}\frac{p^{\beta_M}}{h_c} + 1\right]^{\frac{1}{\beta_M+1}}; & I_L + I_M > 0.5 \\ p\left[\left(\frac{1}{2}-I_L-I_M\right)\frac{\beta_R+1}{sb}\frac{1}{ph_c} + 1\right]^{\frac{1}{\beta_R+1}}; & \text{otherwise} \end{cases} \quad [G]$$

To summarize, this index is daily; captures and data; reacts as the market moves, not in a delayed or "smoothed" fashion; reflects data driven values regardless of actual data volume; and avoids manipulation by illegitimate or erroneous data.

Implementations

As shown in FIG. 12, some implementations include a server 100 (or a set of servers that can be located in a single place or be distributed and coordinated in their operations).

The server can communicate through a public or private communication network or dedicated lines or other medium or other facility 102, for example, the Internet, an intranet, the public switched telephone network, a wireless network, or any other communication medium. Data 103 about transactions 104 involving assets 106 can be provided from a wide variety of data sources 108, 110. The data sources can provide the data electronically in batch form, or as continuous feeds, or in non-electronic form to be converted to digital form.

The data from the sources is cleaned, filtered, processed, and matched by software 112 that is running at the server or at the data sources, or at a combination of both. The result of the processing is a body of cleaned, filtered, accessible transaction data 114 (containing data points) that can be stored 116 at the server, at the sources, or at a combination of the two. The transaction data can be organized by geographical region, by date, and in other ways that permit the creation, storage, and delivery of value indices 118 (and time series of indices) for specific places, times, and types of assets. Histogram spectra of the data, and power law data generated from the transaction data can also be created, stored, and delivered. Software 120 can be used to generate the histogram, power law, index, and other data related to the transaction data.

The stored histogram, power law, index, and other data related to the transaction data can be accessed, studied, modified, and enhanced from anywhere in the world using any computer, handheld or portable device, or any other device 122, 124 capable of communicating with the servers. The data can be delivered as a feed, by email, through web browsers, and can be delivered in a pull mode (when requested) or in a push mode. The information may also be delivered indirectly to end users through repackagers 126. A repackager could simply pass the data through unaltered, or could modify it, adapt it, or enhance it before delivering it. The data could be incorporated into a repackager's website, for example. The information provided to the user will be fully transparent with no hidden assumptions or calculations. The presented index will be clear, consistent, and understandable.

Indices can be presented for each of a number of different geographic regions such as major metropolitan areas, and composite indices for multiple regions and an entire country (the United States, for example) or larger geographic area can be formed and reported. Some implementations use essentially every valid, arm's length sale as the basis for the indices, including new homes, condominiums, house "flips", and foreclosures.

Using the techniques described above enables the generation of statistically accurate and robust values representing price per square foot paid in a defined metropolitan area on a given day.

Use of the index can be made available to users under a variety of business models including licensing, sale, free availability as an adjunct to other services, and in other ways.

In some examples, a business model in which the index may be provided to users has a Level I and a Level II.

In Level I, users can select to create an index value for a number of MSA's of interest. The index value is presented to the user on a webpage. Optionally the value scrolls across the webpage, is found in a frame within the webpage, or is included in a pop-up window. Historical charts representing the daily index value for each of the MSA's of interest are available to Level I users. The user may access the historical data for a specific MSA of interest by selecting the MSA from a drop-down list or selecting a link, and/or the historical data for each MSA of interest may be displayed without being selected by the user. Time periods may also be selected. Non-limiting time periods are hours, days, months, and years. In some embodiments, time periods may be predetermined by the index provider.

Figure 13:
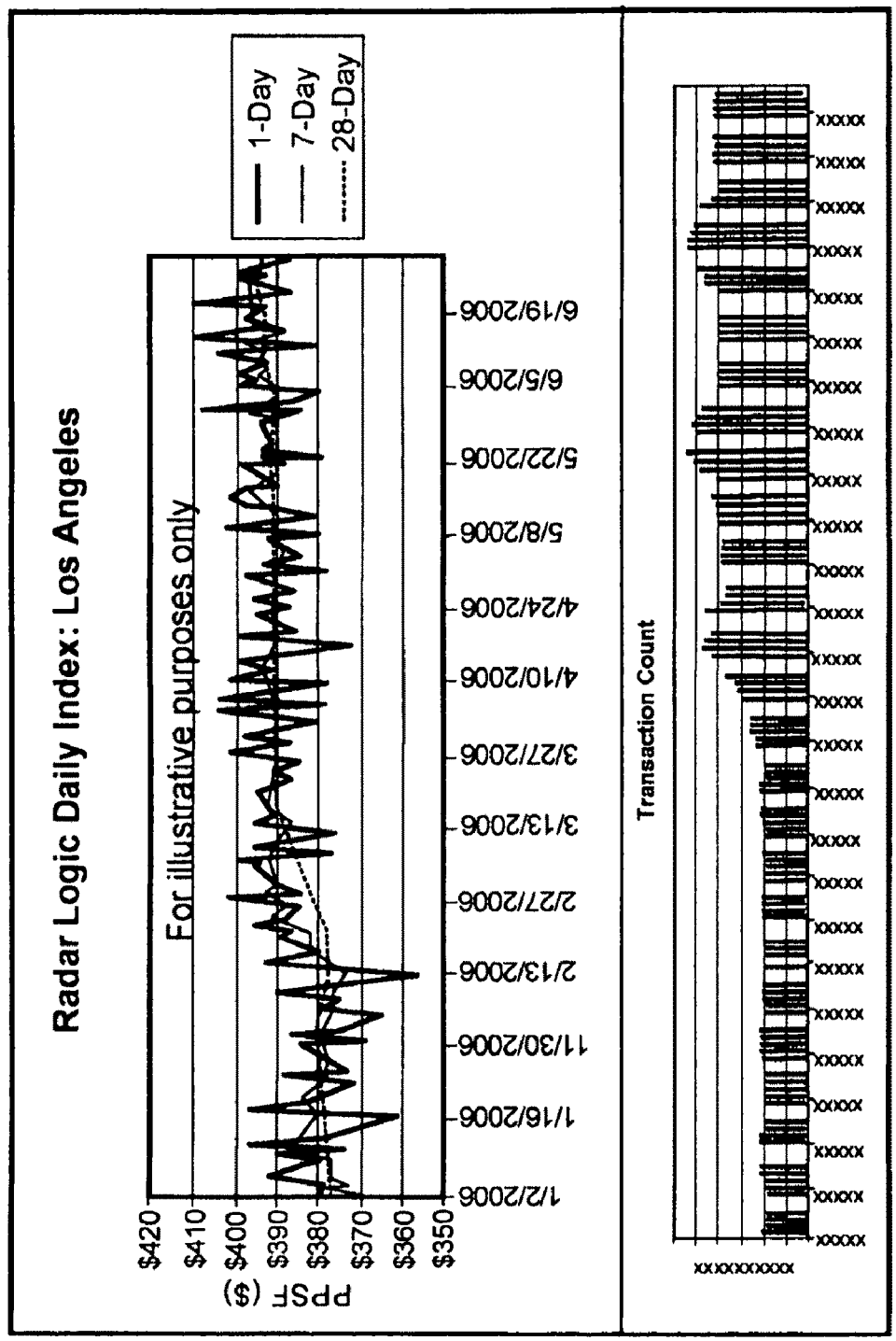

After the index is calculated, as shown in FIG. 13, a chart containing a correlation to financial and/or real estate market indicators may be created for the user to view. Other charts may be created, including, but not limited to, a chart depicting the price of the indexes and number of transactions captured by the indexes. Additionally, a market report or custom report may also be available to the Level I user.

Level II may include the features of Level I plus additional features. Level II may include access to historical index values, and these values may be optionally saved or downloaded by the user. Users may create moving averages of the indexes. For example, by selecting a moving average based on days, users can compare those averages to the daily indexes or some other benchmarks; other time periods may also be used. In some embodiments, the time period is predetermined by the index provider. In addition to the charting capabilities in Level I, Level II users may select the time frames for which data is provided. The time frames may be determined by the user or predetermined by the index provider. A financial benchmark or indicator may be charted and correlated against the index; the financial benchmark or indicator may be from a public or non-public source. Users may have access to sub-indices; the sub-indices may be based on zip code and/or segment, including, but not limited to, size of property, transaction price, and asking price. Various functions may also be present in Level II, including, but not limited to, standard deviation, correlation, Bollinger bands and regression lines. In some embodiments, the market report in Level II is more detailed or thorough compared to the market report in Level I.

FIGS. 21-23 are screen shots showing a technique that can be used for a user to enter selections to view information regarding the index. In the figures, the user selects from a list of options appearing within a window. Other techniques can be used for a user to select a feature, including, but not limited to, making a selection from a drop-down list.

The cost for providing the index to a user is determined by the index provider. Factors that may be considered when determining the cost include, but are not limited to, the number of MSA's selected by the user, the number of times a user is permitted to view the index, the length of time for which the index is to be accessible, and the number of people who are to have access to the index. The index provider optionally may discount the cost for providing the index based on predetermined criteria.

In addition to deriving a daily price index from all of the residential real estate transactions in a given metropolitan statistical area (MSA) of interest, it is also useful to derive subindices each of which is a single measure that is analogous to the main index but is derived from only a subset rather than the full set of residential real estate transactions of the MSA. The choice of subset of transactions from which to derive a subindex could include (without limitation) geographical location (e.g., county by FIPS code, ZIP, neighborhood, urban/suburban/rural, etc.); property value or price range, either absolute (e.g., $500,000-$1,000,000) or fractional (e.g. top 5%); property type (e.g. single family residence, condominium, duplex, etc.); sale date range for aggregation; number of bedrooms; property size (area, number of bedrooms, etc.); owner attributes (individual, company, trust, single, couple, family, etc.); any other recorded transaction/property attribute which allows differentiating; and any combination of the above to satisfy specific needs.

In some examples, we use the same metric for the subindices as we did for the index, namely price per square foot, that is, ppsf=price/area in units of dollars per square foot.

Unlike the full MSA indices, which are benchmarks for residential real-estate transactions, subindices are intended as a secondary analysis tool for groups having an interest in a specific sector of the residential real estate market. As such, they afford greater flexibility and do not require the same stringent commitments adopted for their full MSA counterparts. In practice this means several things.

The requirement for the subindices to be daily, though still desirable, can be relaxed; if the volume of statistics is low, then aggregate subindices are an option (e.g., weekly, monthly, quarterly, etc.). It is preferable for the subindex formulation to be analogous to its full index counterpart, though not mandatory. If TPL is not the underlying PDF of the transaction ppsf subset pertaining to the subindex, or if the median is not the most meaningful and robust metric for that subset, then other suitable formulations for the PDF or measures for the subindex may be acceptable. The choice of a timescale other than a day for aggregation, a parameterization other than TPL for the description of the underlying PDF, or a measure other than the median for the subindex, can be decided on a case-by-case basis, depending on the set of selection criteria that define the subindex. These determinations can differ for different selection criteria and their resulting subindices.

Possible uses of the subindices include the following. Subindices may be combined into groups for basis and other analyses relating to segments within specific MSAs or among different MSAs. Subindices may be published as specific bases for financial and derivative instruments, or may be licensed for private label use by industry and market participants. Subindices will be available for analytic, research and consulting services Subindices will be available for use in other socio-economic analysis and consulting as appropriate. Subindices will be available for use in providing products and services to government entities and agencies.

If the approach for the computation of the subindex were to be the same as some examples used for the full index, then the steps to follow would be: Identify a set of selection criteria of interest. Apply these criteria to select subsets of daily transactions for a given MSA. Fit the TPL parameters to the empirical ppsf spectra of these subsets to fix their values. Compute daily subindices from TPL using the daily parameter values.

The subindex computation may, however, require modification of this sequence.

First, the volume of daily transactions may be low for some MSAs routinely, periodically, or occasionally. Data used in the computation of a subindex can depend on arbitrary user-defined criteria that can potentially select tiny subsets, possibly of already low-volume datasets. Determining the values for the parameters of a model PDF using low statistics data may be unfeasible. Moreover, even if the data volume technically suffices to yield values for a fit, consistently low volumes below statistical significance levels over prolonged periods could result in the subindex time series probing noise (statistical fluctuations) as opposed to actual value movements in the marketplace. Such issues could register as high volatility in the subindex time series and suggest incoherent trends not attributable to real causes.

Extremely low statistics due to severe filtering caused by particular selection criteria is a generic issue not specific to TPL that would affect any data-driven parametric subindex, derived from a parameterization of a model PDF fitted to the data.

One way to accommodate low transaction volumes due to filtering by severe selection criteria is to relax the requirement for the subindex to be daily and compensate for poor statistics by longer timescales. This entails generating subindices at intervals long enough to accumulate statistically significant transaction volumes, e.g. weekly, biweekly, monthly or quarterly.

After filtering the daily transaction data of an MSA using a set of desired selection criteria, it may happen that the resulting ppsf spectrum is no longer characterized by a TPL, i.e., does not exhibit three regions each described by a power law and joined continuously at their interfaces. The following discussion explains why.

Typical MSA's are large and inhomogeneous enough to mirror a full socioeconomic spectrum. The TPL distribution is characterized by its shape and position, which are respectively slowly varying and volatile. The shape conveys the distribution of relative quality of the underlying housing stock. Scale invariance is a key property of power laws, which in a context that's relevant for this discussion means that what holds for ppsf values of individual properties also holds for clusters of suitably selected properties. For instance, a full MSA may comprise an urban core consisting predominantly of upscale condominiums and low income multi-family housing; a suburban ring primarily of single family and country style houses, and secondarily condominiums, reflecting from middle to high incomes; and a more remote periphery largely of single family houses, with or without a coherent socioeconomic character. The totality of the clusters of all the counties of an MSA aggregated into a single spectrum may collectively fill the continuum of ppsf values. The slope of the middle power law in TPL in effect captures the features of the continuum of all such clusters in a full MSA.

If one filters the data by selection criteria whose effect is to remove any number of such clusters, then the continuity of the ppsf spectrum may be broken up, and the distribution of the resulting fragmentary spectrum may no longer conform to a TPL. To the extent that the underlying value movement dynamics remain similar to what they are for the full spectrum, one would expect the individual residual clusters in themselves to satisfy power laws, though the middle region of TPL which was formerly determined by the continuum of clusters may no longer appear continuous but fragmented.

For partial transaction data representing less than a full MSA, one might expect the resulting fragmentary ppsf spectra to comprise discrete residual clusters of types of properties that themselves obey power laws, though in aggregate they no longer form a continuous spectrum conformant to TPL. Under these circumstances, a suitable parameterization of the underlying distribution, in particular its shape, could be best described as a collection of discrete peaks each of which could be represented by a double-tailed power law over a narrow ppsf range. Therefore TPL can be considered as a special case of a multi-peaked spectrum, one in which the underlying housing stock spans the full continuum of ppsf values.

Fragmentary spectra as described above can arise e.g. by selecting exclusive or low-income areas or selecting urban cores that may be lacking certain components of the spectrum altogether (e.g., the profile of downtown areas may be predominantly all condominiums and little to no single family residences). Although fragmentary spectra arise predominantly from filtering the set of transactions of a full MSA, it is conceivable that some MSA's exhibit by themselves fragmentary spectra as opposed to a full continuum. This may be the case e.g., for intensely urban MSA's that do not capture the full socioeconomic spectrum, but have a special nature being made up of constituents that are in number or proportion unrepresentative of society at large (e.g., NY).

Thus, sets of transaction data that reflect a range or composition of constituencies unrepresentative of society at large may exhibit fragmentary ppsf spectra. Such sets of data may arise from filtering by certain selection criteria, e.g., for computing a subindex, or by the nature of a full MSA, in the latter case affecting the computation of an main index as well.

In such cases, the shape of the distribution may no longer conform to a TPL, but rather look like a series of discrete double-power law peaks. One can in principle apply similar techniques as for the derivation of TPL to formulate parameterizations for such multi-peaked distributions, fit them to the relevant data, and proceed to compute indices based on them.

For example, FIGS. 24A and 24B show ppsf spectra by property type in the Boston area for transactions on Sep. 30, 2005. The spectrum 200 is the full spectrum. Spectrum 202 is for single family residences, spectrum 204 is for condos, spectrum 206 for residential other than single family and condos (e.g. duplex, triplex, vacant, etc.), spectrum 208 for commercial. FIG. 24A shows the composition for the full Boston MSA, comprising five counties. FIG. 24B shows the composition for Suffolk County only, including Boston. The spectrum of the latter is unrepresentative of the full MSA and not conformant to TPL.

A simpler approach can be used as an approximation to derive subindices, which does not directly address the above issues.

The method includes the following steps:

For the full set of daily transactions of an MSA compute the daily index, namely the TPL-derived median. Use this as the basis from which to obtain an estimate of subsequent subindices. We will refer to this as TPL Median.

If the sale date range for aggregation used for the subindex is greater than a single day, then the TPL Median to use as reference is a variant of the daily index that differs from it in that the position parameter is obtained from fitting TPL to ppsf data aggregated over a length of time equal to the sale date range of choice for the subindex. In particular data is aggregated over as many days the sale date range encompasses up to and including the date for which the index is computed. Apart from this, the shape parameters are obtained as for the daily index, namely using data for a full year, and other aspects of the algorithm are as described earlier for the main daily index.

For the same set of the above MSA transactions aggregated over the sale date range of choice for the subindex, compute the median using the ppsf data without invoking TPL. We refer to this as the Full Dataset Median.

To the ppsf data of the prior step, apply the selection that defines the subindex. Compute the median using these data without invoking TPL. We will be referring to this as Subset Median.

Define the subindex as follows:

$$\text{Subindex} = \frac{\text{Subset Median}}{\text{Full Dataset Median}} TPL \text{ Median}$$

The underlying assumption in the above expression is that a subindex scales to a full MSA index (i.e. the TPL Median) as the ratio of their respective medians. This is the more valid the more the underlying distribution of the ppsf subset selected for the subindex conforms to TPL. In contrast, discussed earlier, this approximation may be poor in cases where the full ppsf spectrum used for the index and that selected by the criteria which define the subindex differ considerably. This may generally be the case for intensely urban counties/areas, or other selections known to focus on a specific sample of properties atypical of society at large.

An alternative approximation for cases where the above condition is not satisfied is $$\text{Subindex} = \frac{\text{Subset Mean}}{\text{Full Dataset Mean}} TPL \text{ Median}$$

arrived at by following the steps computing the full and subset means from the data in place of their respective medians. This is only marginally more justifiable than using the ratio of the medians in the case the overlap between the full and selected ppsf spectra is poor, in which case it will also be inaccurate due to the fact that the reference TPL Median will be unrepresentative of the conditions underlying the selected dataset for the subindex.

Additional information about the use of indexes of real estate values in connection with trading instruments is set forth in United States patent publications 20040267657, published on Dec. 30, 2004, and 20060100950, published on May 11, 2006, and in international patent publications WO 2005/003908, published on Jan. 15, 2005, and WO 2006/043918, published on Apr. 27, 2006, all of the texts of which are incorporated here by reference.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims.

The invention claimed is:

1. A computer-based method comprising performing, with one or more computers, the steps of:
representing transactions involving sales of real estate assets in a geographical region, as respective sets of data points associated with values of the real estate assets, the data points including transaction value information including price per unit area and transaction date for each transaction,
determining parameters that fit probability density functions to at least one component of a value spectrum of the data points, the value spectrum being a log-log spectrum of a number of sales in the geographical region on a given transaction date versus price per unit area, the probability density function for at least one of the components comprising a triple power law including a first power law, a second power law, and a third power law, the parameters not including an offset parameter representing possible shifts in the value spectrum over time, the first power law applying between a price per unit area a and a price per unit area b, the second power law applying between the price per unit area b and a price per unit area c, the third power law applying between the price per unit area c and a price per unit area d, wherein the triple power law comprises:

$$f(x) = \begin{cases} h_b\left(\frac{x-a}{b-a}\right)^{\beta_L}; & a \leq x \leq b \\ h_c\left(\frac{x-a}{c-a}\right)^{\beta_M}; & b \leq x \leq c \\ h_c\left(\frac{x-a}{c-a}\right)^{\beta_R} & c \leq x \leq d \end{cases}$$

wherein $h_b$ is a height of the value spectrum at b, $h_c$ is a height of the value spectrum at c, $\beta_L$ is an exponent of the first power law, $\beta_M$ is an exponent of the second power law, $\beta_R$ is an exponent of the third power law; and forming a daily index of values associated with the assets using at least one of the determined parameters, wherein for each day, the daily index provides a price per unit area for transactions involving real estate assets on said each day in the geographical region.

2. The computer-based method of claim 1 in which data points are excluded that are associated with values that are outside defined cutoffs.

3. The computer-based method of claim 2 in which the defined cutoffs include a lower cutoff that is a function of a minimum value of any of the data points.

4. The computer-based method of claim 2 in which the defined cutoffs include an upper cutoff that corresponds to a maximum value of any of the data points.

5. A computer-based method comprising performing, with one or more computers, the steps of representing transactions involving sales of real estate assets in a geographical region, as respective sets of data points associated with values of the real estate assets, the data points including transaction value information including price per unit area and transaction date for each transaction, determining parameters that fit probability density functions to at least one component of a value spectrum of the data points, the value spectrum being a log-log spectrum of a number of sales in the geographical region on a given transaction date versus price per unit area, the probability density function for at least one of the components comprising a power law, the parameters being separated into parameters that characterize a shape of the probability density function but not its position and at least one parameter that characterizes its position but not its shape, wherein the power law comprises a triple power law including first power law, a second power law, and a third power law, the first power law applying between a price per unit area a and a price per unit area b, the second power law applying between the price per unit area b and a price per unit area c, the third power law applying between the price per unit area c and a price per unit area d, wherein the at least one parameter that characterizes its position but not its shape includes b, and wherein the parameters that characterize a shape of the probability density function but not its position include p, $h_c$, $\beta_L$ and $\beta_M$, and wherein the triple power law comprises:

$$f(x) = s\begin{cases} x'^{\beta_L}; & x'_{min} < x' \leq 1 \\ h_c\left(\frac{x'}{p}\right)^{\beta_M}; & 1 < x' < p \\ h_c\left(\frac{x'}{p}\right)^{\beta_R}; & p \leq x' \leq x'_{max} \end{cases}$$

where $x' = x/b$, $x_{min}/b$, s is a constant, and $x_{max}' = x_{max}/b$, where $c = pb$, $1 < p$, where $x_{min}$ is a minimum price per unit area value of the value spectrum, $x_{max}$ is a maximum price per unit area value of the value spectrum, $h_c$ is a height of the value spectrum at c, $\beta_L$ is an exponent of the first power law, $\beta_M$ is an exponent of the second power law, $\beta_R$ is an exponent of the third power law; and forming a daily index of values associated with the assets using at least one of the determined parameters, wherein for each day, the daily index provides a price per unit area for transactions involving real estate assets on said each day in the geographical region.

6. The method of claim 5 in which there is only a single parameter that characterizes the position of the probability distribution function.

7. The method of claim 5 in which the shape parameters are fit using data for many days and the single position parameter is fit using data for a single day.

8. A computer-based method comprising performing, with one or more computers, the steps of:

representing transactions involving sales of real estate assets in a geographical region, as respective sets of data points associated with values of the real estate assets, the data points including transaction value information including price per unit area and transaction date for each transaction, determining parameters that fit probability density functions to at least one component of a value spectrum of the data points, the value spectrum being a log-log spectrum of a number of sales in the geographical region on a given transaction date versus price per unit area, the probability density function for at least one of the components comprising a triple power law including a first power law, a second power law, and a third power law, the parameters not including an offset parameter representing possible shifts in the value spectrum over time, the first power law applying between a price per unit area a and a price per unit area b, the second power law applying between the price per unit area b and a price per unit area c, the third power law applying between the price per unit area c and a price per unit area d, wherein a is defined as a minimum price per unit area value of the value spectrum $x_{min}$, d is defined as a maximum price per unit area value of the value spectrum $x_{max}$, and the triple power law comprises $$f(x) = \begin{cases} h_b\left(\frac{x}{b}\right)^{\beta_L}; & x_{min} \leq x \leq b \\ h_c\left(\frac{x}{c}\right)^{\beta_M}; & b \leq x \leq c \\ h_c\left(\frac{x}{c}\right)^{\beta_R}; & c \leq x \leq x_{max} \end{cases}$$

wherein $h_b$ is a height of the value spectrum at b, $h_c$ is a height of the value spectrum at c, $\beta_L$ is an exponent of the first power law, $\beta_M$ is an exponent of the second power law, $\beta_R$ is an exponent of the third power law.

9. A computer-based method comprising performing, with one or more computers, the steps of:

representing transactions involving sales of real estate assets in a geographical region, as respective sets of data points associated with values of the real estate assets, the data points including transaction value information including price per unit area and transaction date for each transaction, determining parameters that fit probability density functions to at least one component of a value spectrum of the data points, the value spectrum being a log-log spectrum of a number of sales in the geographical region on a given transaction date versus price per unit area, the probability density function for at least one of the components comprising a triple power law including a first power law, a second power law, and a third power law, the parameters not including an offset parameter representing possible shifts in the value spectrum over time, the first power law applying between a price per unit area a and a price per unit area b, the second power law applying between the price per unit area b and a price per unit area c, the third power law applying between the price per unit area c and a price per unit area d, wherein the triple power law comprises:

$$f(x) = s \begin{cases} x'^{\beta_L}; & x'_{min} < x' \leq 1 \\ h_c \left(\dfrac{x'}{p}\right)^{\beta_M}; & 1 < x' < p \\ h_c \left(\dfrac{x'}{p}\right)^{\beta_R}; & p \leq x' \leq x'_{max} \end{cases}$$

where $x'=x/b$, $x_{min}'=x_{min}/b$, s is a constant, and $x_{max}'=x_{max}/b$, where $c=pb$, $1<p$, where is a minimum price per unit area value of the value spectrum, $x_{max}$ is a maximum price per unit area value of the value spectrum, $h_c$ is a height of the value spectrum at c, $\beta_L$ is an exponent of the first power law, $\beta_M$ is an exponent of the second power law, $\beta_R$ is an exponent of the third power law.

* * * * *